US009785906B2

(12) United States Patent
Reid et al.

(10) Patent No.: US 9,785,906 B2
(45) Date of Patent: Oct. 10, 2017

(54) CONTENT FEEDBACK IN A MULTIPLE-OWNER CONTENT MANAGEMENT SYSTEM

(75) Inventors: Gregory S. Reid, Boxford, MA (US); Timothy Ringo, London (GB); David P. Lane, London (GB); Elizabeth H. Lian, Brookline, MA (US); Daniel C. Farrell, London (GB); Craig Fenton, London (GB); Elise Shearing, London (GB); Randy Bell, Ottawa, IL (US); Sevasti Wong, London (GB); Anthony Lingham, London (GB); Audrey Forrester, Mearnskirk (GB); Claudia Staubitz, Woodbridge (GB); Kevin Adams, Stoke-On-Trent (GB); Lesley Pickering, Liverpool (GB); Paul Ritchie, Liverpool (GB)

(73) Assignee: Accenture Global Services Limited, Dublin (IE)

( * ) Notice: Subject to any disclaimer, the term of this patent is extended or adjusted under 35 U.S.C. 154(b) by 188 days.

(21) Appl. No.: 13/313,316

(22) Filed: Dec. 7, 2011

(65) Prior Publication Data

US 2012/0150574 A1     Jun. 14, 2012

Related U.S. Application Data

(63) Continuation of application No. 12/179,429, filed on Jul. 24, 2008, now Pat. No. 8,090,624, which is a
(Continued)

(51) Int. Cl.
*G06Q 10/00*     (2012.01)
*G06Q 10/06*     (2012.01)
(Continued)

(52) U.S. Cl.
CPC ..... *G06Q 10/06398* (2013.01); *G06Q 10/063* (2013.01); *G06Q 10/06393* (2013.01);
(Continued)

(58) Field of Classification Search
CPC .. G06Q 10/06; G06Q 10/063; G06Q 10/0639; G06Q 10/06393; G06Q 10/06395; G06Q 10/06398
See application file for complete search history.

(56) References Cited

U.S. PATENT DOCUMENTS 4,905,163 A     2/1990    Garber
5,008,853 A     4/1991    Bly et al.
(Continued)

FOREIGN PATENT DOCUMENTS

AU     2003300686     1/2008
AU     2003295947     9/2008
(Continued)

OTHER PUBLICATIONS

Thomas Li-Ping, Tang, and Sarsfield-Baldwin, Linda. "Distributive and Procedural Justice as Related to Satisfaction and Commitment". Houston, TX: 1996. Print.*
(Continued)

*Primary Examiner* — William Brockington, III
(74) *Attorney, Agent, or Firm* — Harrity & Harrity, LLP

(57) ABSTRACT

New functions for a contact center system include: testing user's comprehension of informational messages; capturing insight users having a KPI score above a threshold by having those users submit information on why they perform well; dynamically ordering solutions to issues by re-ranking the solutions periodically based on recency and frequency; integrating information for use by a contact center representative while online with a customer and information for use when not online; storing content items in a telecommu-
(Continued)

nications industry taxonomy; directing user feedback on a content item to the proper owner/manager of that content; communicating solution information using a solutions taxonomy; displaying a dual information system having a CRM application and reference material that's context-appropriate; enforcing completion of a group of templates when creating a content item to be published; ensuring a group of templates for a content item are complete before publishing them; and searching within a contact center system.

18 Claims, 43 Drawing Sheets

Related U.S. Application Data continuation of application No. 10/306,025, filed on Nov. 27, 2002, now Pat. No. 7,418,403.

(51) Int. Cl.
G06Q 10/10 (2012.01)
G06Q 30/06 (2012.01)
G06Q 50/18 (2012.01)

(52) U.S. Cl.
CPC ......... *G06Q 10/10* (2013.01); *G06Q 30/0601* (2013.01); *G06Q 30/0641* (2013.01); *G06Q 50/184* (2013.01)

(56) References Cited

U.S. PATENT DOCUMENTS

| | | | |
|---|---|---|---|
| 5,206,903 A | 4/1993 | Kohler et al. | |
| 5,239,460 A | 8/1993 | La Roche | |
| 5,355,444 A | 10/1994 | Chirico | |
| 5,365,425 A | 11/1994 | Torma et al. | |
| 5,500,795 A | 3/1996 | Powers et al. | |
| 5,535,256 A | 7/1996 | Maloney et al. | |
| 5,550,746 A | 8/1996 | Jacobs | |
| 5,557,780 A | 9/1996 | Edwards et al. | |
| 5,625,767 A | 4/1997 | Bartell et al. | |
| 5,673,369 A | 9/1997 | Kim | |
| 5,712,985 A * | 1/1998 | Lee et al. | 705/7.31 |
| 5,788,508 A | 8/1998 | Lee et al. | |
| 5,819,232 A * | 10/1998 | Shipman | 705/7.24 |
| 5,875,446 A | 2/1999 | Brown et al. | |
| 5,903,235 A | 5/1999 | Nichols | |
| 5,983,200 A | 11/1999 | Slotznick | |
| 5,995,948 A | 11/1999 | Whitford et al. | |
| 6,012,056 A | 1/2000 | Menlove | |
| 6,049,779 A | 4/2000 | Berkson | |
| 6,064,979 A | 5/2000 | Perkowski | |
| 6,070,158 A | 5/2000 | Kirsch et al. | |
| 6,078,866 A | 6/2000 | Buck et al. | |
| 6,078,891 A | 6/2000 | Riordan et al. | |
| 6,115,693 A | 9/2000 | McDonough et al. | |
| 6,128,380 A | 10/2000 | Shaffer et al. | |
| 6,149,438 A | 11/2000 | Richard et al. | |
| 6,157,926 A | 12/2000 | Appleman et al. | |
| 6,178,407 B1 | 1/2001 | Lotvin et al. | |
| 6,185,550 B1 | 2/2001 | Snow et al. | |
| 6,226,648 B1 | 5/2001 | Appleman et al. | |
| 6,233,575 B1 | 5/2001 | Agrawal et al. | |
| 6,243,092 B1 | 6/2001 | Okita et al. | |
| 6,272,507 B1 | 8/2001 | Pirolli et al. | |
| 6,278,993 B1 | 8/2001 | Kumar et al. | |
| 6,308,188 B1 | 10/2001 | Bernardo et al. | |
| 6,310,951 B1 | 10/2001 | Wineberg et al. | |
| 6,315,572 B1 | 11/2001 | Owens et al. | |
| 6,317,142 B1 | 11/2001 | Decoste et al. | |
| 6,321,224 B1 | 11/2001 | Beall et al. | |
| 6,324,282 B1 | 11/2001 | McIllwaine et al. | |
| 6,336,132 B2 | 1/2002 | Appleman et al. | |
| 6,339,774 B1 | 1/2002 | Nakayama et al. | |
| 6,345,288 B1 | 2/2002 | Reed et al. | |
| 6,421,669 B1 | 7/2002 | Gilmour et al. | |
| 6,438,353 B1 | 8/2002 | Casey-Cholakis et al. | |
| 6,446,083 B1 | 9/2002 | Leight et al. | |
| 6,509,914 B1 | 1/2003 | Babula et al. | |
| 6,519,571 B1 | 2/2003 | Guheen et al. | |
| 6,542,898 B1 | 4/2003 | Sullivan et al. | |
| 6,560,589 B1 | 5/2003 | Stier et al. | |
| 6,567,800 B1 | 5/2003 | Barrera et al. | |
| 6,601,057 B1 | 7/2003 | Underwood et al. | |
| 6,601,759 B2 | 8/2003 | Fife et al. | |
| 6,603,852 B2 | 8/2003 | Saito et al. | |
| 6,603,854 B1 | 8/2003 | Judkins et al. | |
| 6,606,581 B1 | 8/2003 | Nickerson et al. | |
| 6,606,740 B1 | 8/2003 | Lynn et al. | |
| 6,606,744 B1 | 8/2003 | Mikurak | |
| 6,697,825 B1 | 2/2004 | Underwood et al. | |
| 6,700,971 B1 | 3/2004 | Cohen et al. | |
| 6,745,238 B1 | 6/2004 | Giljum et al. | |
| 6,754,346 B2 | 6/2004 | Eiserling et al. | |
| 6,760,727 B1 | 7/2004 | Schroeder et al. | |
| 6,782,093 B2 | 8/2004 | Uckun | |
| 6,807,544 B1 | 10/2004 | Morimoto et al. | |
| 6,850,896 B1 | 2/2005 | Kelman et al. | |
| 6,874,002 B1 | 3/2005 | Peleus et al. | |
| 6,910,045 B2 | 6/2005 | Hickey et al. | |
| 6,968,512 B2 | 11/2005 | Duxbury | |
| 6,988,126 B2 | 1/2006 | Wilcock et al. | |
| 7,000,194 B1 | 2/2006 | Newbold | |
| 7,029,280 B2 | 4/2006 | Krebs et al. | |
| 7,039,594 B1 | 5/2006 | Gersting | |
| 7,062,505 B2 | 6/2006 | Lane | |
| 7,181,413 B2 | 2/2007 | Hadden et al. | |
| 7,200,614 B2 | 4/2007 | Reid | |
| 7,392,232 B1 | 6/2008 | Wizdo et al. | |
| 7,395,499 B2 | 7/2008 | Lane et al. | |
| 7,428,505 B1 * | 9/2008 | Levy | G06Q 10/06395 705/35 |
| 8,090,624 B2 | 1/2012 | Reid et al. | |
| 2001/0032120 A1 | 10/2001 | Stuart et al. | |
| 2001/0056367 A1 | 12/2001 | Herbert et al. | |
| 2002/0007300 A1 | 1/2002 | Slatter | |
| 2002/0022982 A1 | 2/2002 | Cooperstone et al. | |
| 2002/0038217 A1 | 3/2002 | Young | |
| 2002/0038223 A1 | 3/2002 | Niitsuma et al. | |
| 2002/0046244 A1 | 4/2002 | Simson et al. | |
| 2002/0057297 A1 | 5/2002 | Grimes et al. | |
| 2002/0059395 A1 | 5/2002 | Liou | |
| 2002/0065697 A1 * | 5/2002 | Cautley et al. | 705/7 |
| 2002/0073165 A1 | 6/2002 | McNulty et al. | |
| 2002/0073208 A1 | 6/2002 | Wilcock et al. | |
| 2002/0087526 A1 | 7/2002 | Rao | |
| 2002/0091558 A1 * | 7/2002 | Anderson et al. | 705/9 |
| 2002/0091690 A1 | 7/2002 | Bailey et al. | |
| 2002/0099582 A1 | 7/2002 | Buckley et al. | |
| 2002/0120485 A1 | 8/2002 | Kirkconneii-Ewing et al. | |
| 2002/0123983 A1 | 9/2002 | Riley et al. | |
| 2002/0133392 A1 | 9/2002 | Angel et al. | |
| 2002/0140741 A1 | 10/2002 | Felkey et al. | |
| 2002/0143604 A1 * | 10/2002 | Cox et al. | 705/10 |
| 2002/0143615 A1 | 10/2002 | Palmer et al. | |
| 2002/0143818 A1 | 10/2002 | Roberts et al. | |
| 2002/0147632 A1 | 10/2002 | Winham et al. | |
| 2002/0152112 A1 * | 10/2002 | Myers et al. | 705/11 |
| 2002/0152267 A1 | 10/2002 | Lennon | |
| 2002/0154157 A1 | 10/2002 | Sherr et al. | |
| 2002/0165799 A1 | 11/2002 | Jaffe et al. | |
| 2002/0173971 A1 | 11/2002 | Stirpe et al. | |
| 2002/0180803 A1 | 12/2002 | Kaplan et al. | |
| 2002/0184085 A1 * | 12/2002 | Lindia et al. | 705/11 |
| 2003/0009373 A1 * | 1/2003 | Ensing | G06Q 10/0637 705/7.33 |
| 2003/0014442 A1 | 1/2003 | Shiigi et al. | |
| 2003/0023622 A1 | 1/2003 | Obermeyer et al. | |
| 2003/0028595 A1 | 2/2003 | Vogt et al. | |
| 2003/0037177 A1 | 2/2003 | Sutton et al. | |
| 2003/0048893 A1 * | 3/2003 | McIllwaine | G06Q 10/06398 379/265.06 |
| 2003/0050986 A1 | 3/2003 | Matthews et al. | |

(56) References Cited

U.S. PATENT DOCUMENTS

| | | | |
|---|---|---|---|
| 2003/0055757 A1 | 3/2003 | Pfiffner et al. | |
| 2003/0055831 A1 | 3/2003 | Ryan et al. | |
| 2003/0065553 A1* | 4/2003 | Couchot et al. | 705/10 |
| 2003/0069780 A1 | 4/2003 | Hailwood et al. | |
| 2003/0074243 A1 | 4/2003 | Po | |
| 2003/0083922 A1 | 5/2003 | Reed | |
| 2003/0088545 A1 | 5/2003 | Subramaniam et al. | |
| 2003/0097273 A1 | 5/2003 | Carpenter et al. | |
| 2003/0130883 A1* | 7/2003 | Schroeder et al. | 705/10 |
| 2003/0130993 A1 | 7/2003 | Mendelevitch et al. | |
| 2003/0137544 A1 | 7/2003 | Mears et al. | |
| 2003/0151629 A1 | 8/2003 | Krebs | |
| 2003/0158872 A1 | 8/2003 | Adams | |
| 2003/0164849 A1* | 9/2003 | Barrie et al. | 345/733 |
| 2003/0187932 A1 | 10/2003 | Kennedy | |
| 2003/0229623 A1 | 12/2003 | Chang et al. | |
| 2003/0233372 A1 | 12/2003 | Warner et al. | |
| 2004/0015405 A1 | 1/2004 | Cloutier et al. | |
| 2004/0019536 A1 | 1/2004 | Ashkenazi et al. | |
| 2004/0030992 A1 | 2/2004 | Moisa | |
| 2004/0039990 A1 | 2/2004 | Bakar et al. | |
| 2004/0062381 A1 | 4/2004 | Shambaugh et al. | |
| 2004/0100493 A1 | 5/2004 | Reid et al. | |
| 2004/0102982 A1 | 5/2004 | Reid et al. | |
| 2004/0103019 A1 | 5/2004 | Reid | |
| 2004/0103089 A1 | 5/2004 | Lane | |
| 2004/0117383 A1 | 6/2004 | Lee et al. | |
| 2004/0128611 A1 | 7/2004 | Reid et al. | |
| 2004/0153428 A1 | 8/2004 | Reid et al. | |
| 2004/0162768 A1* | 8/2004 | Snyder et al. | 705/28 |
| 2004/0162800 A1 | 8/2004 | Reid et al. | |
| 2004/0162812 A1 | 8/2004 | Lane et al. | |
| 2004/0177059 A1 | 9/2004 | Horie et al. | |
| 2004/0193475 A1 | 9/2004 | Hemm et al. | |
| 2004/0199496 A1 | 10/2004 | Liu et al. | |
| 2004/0205572 A1 | 10/2004 | Fields et al. | |
| 2004/0205659 A1 | 10/2004 | Barry et al. | |
| 2005/0014116 A1 | 1/2005 | Reid et al. | |
| 2006/0026655 A1 | 2/2006 | Perez | |
| 2007/0206768 A1 | 9/2007 | Bourne et al. | |

FOREIGN PATENT DOCUMENTS

| | | |
|---|---|---|
| AU | 2003302251 | 9/2008 |
| AU | 2003304335 | 9/2008 |
| AU | 2003302349 | 12/2008 |
| DE | 102 44 726 | 7/2003 |
| EP | 1 241 596 | 9/2002 |
| JP | 10083386 A | 3/1998 |
| JP | 11234408 A | 8/1999 |
| JP | 11345185 A | 12/1999 |
| JP | 11346266 | 12/1999 |
| JP | 2000-156720 | 5/2000 |
| JP | 2001052019 A | 2/2001 |
| JP | 2001-273432 A | 5/2001 |
| JP | 2001125857 A | 5/2001 |
| JP | 2002024291 A | 1/2002 |
| JP | 2002109012 A | 4/2002 |
| JP | 2002183414 | 6/2002 |
| JP | 2002183537 | 6/2002 |
| JP | 2002244964 A | 8/2002 |
| JP | 2002304394 | 10/2002 |
| WO | WO 02/05508 | 1/2002 |
| WO | WO 02/08946 | 1/2002 |
| WO | WO 02/073331 | 9/2002 |
| WO | WO02/103576 A1 | 12/2002 |
| WO | WO 03/032226 | 4/2003 |
| WO | WO2004/049220 | 6/2004 |
| WO | WO2004/049221 A2 | 1/2008 |

OTHER PUBLICATIONS

Alban, "Customer Interaction Monitoring: Your Key to Measuring Service Perfonmance," *Australian Banking & Finance*, Apr. 18, 2001, vol. 10, No. 6, 5 pages.

Allen et al., "Method for Using Global Position System to Find Close Services," *IBM Technical Disclosure Bulletin*, Jan. 1998, p. 693, vol. 41, No. 1, 1 page.

Click2Coach Web Pages, Retrieved from www.envisiontelephony. com 2001, 2 pages.

Product Infonmation Brochure, *Click2Coach* by Envision Telephony, 2001, 6 pages.

"What Makes Your Contact Center Agents Truly Effective?," *Click2Coach* by Envision Telephony, 2000, 8 pages.

Cunliffe, "Super Systems Capture Expertise of the Specialist," *Toronto Star*, Nov. 2, 1986, p. F-4, 3 pages.

"Emvolve Perfonmance Manager Release 1.5," *Customer Inter@ction Solutions*, Nov. 2001, pp. 53-56, vol. 20, No. 5, 4 pages.

"eOn Communications and Eyretel Partner to Deliver Performance Improvement for Contact Centers," *PR Newswire*, Apr. 4, 2002, 3 pages.

Feasel et al., "Training Can Produce Better Reps," *Call Center Solutions*, Oct. 1998, pp. 138-143, vol. 17, No. 4, 5 pages.

"Kelly Services Expands KellyConnect Call Center Solution," *PR Newswire*, Jan. 14, 2002, p. 1, 3 pages.

"Kelly Services® Offers Improved Call Center Solution," *PR Newswire*, Apr. 24, 2000, p. 1, 2 pages.

"Knowlagent and Eyretel Partner to Deliver Integrated E-Learning Platform to Global Clients," *PR Newswire*, May 10, 2001, 4 pages.

"Primus Taps OutSights to Deliver Expertise to Customers Shifting to Knowledge-Based Support," *Business Wire*, Jun. 29, 1999, p. 1, 3 pages.

Rosati, "Measuring the Reality of the Customer Experience," *Customer Inter@ction Solutions*, May 2002, pp. 38-43, vol. 20, No. 11, 5 pages.

"ServiceSoft Delivers 'Smart Answers' at Xerox," *Business Wire*, Aug. 4, 1998, 2 pages.

"Telvista Integrates eLearning and Quality Monitoring," The Ascent Group, Inc., *Call Center E-Journal*, Aug. 2001, 5 pages.

Tiwana, "The Knowledge Management Toolkit," *Prentice Hall*, Dec. 6, 1999, ISBN: 0-13-012853-8m 106 pages.

Office Action issued by EPO on Appl. No. 03808324.2-2221, dated Jul. 30, 2007, regarding summons to attend oral proceedings on Dec. 13, 2007, 8 pages.

Office Action issued by the Chinese Patent Office on Chinese Appl. No. 200380106314.X, dated Sep. 28, 2007, 14 pages.

Office Action issued on U.S. Appl. No. 10/306,705, dated Oct. 9, 2007, 11 pages.

Office Action issued on U.S. Appl. No. 10/305,858, dated Oct. 19, 2007, 25 pages.

Office Action issued on U.S. Appl. No. 10/306,386, dated Dec. 11, 2007, 12 pages.

Office Action issued on U.S. Appl. No. 10/306,248, dated Jan. 7, 2008, 17 pages.

Office Action issued on U.S. Appl. No. 10/306,564, dated Jan. 7, 2008, 20 pages.

Office Action issued on U.S. Appl. No. 10/306,563, dated Jan. 8, 2008, 12 pages.

Office Action issued on U.S. Appl. No. 10/305,811, dated Jan. 18, 2008, 15 pages.

Notice of Allowance issued on U.S. Appl. No. 10/306,026, dated Jan. 28, 2008, 7 pages.

Office Action issued on U.S. Appl. No. 10/306,386, dated Jan. 29, 2008, 14 pages.

Dayco Statement Regarding Related Applications dated Dec. 30, 2003 (3 pages).

Angus, Jeff, Diagnostic Utility Software, InfoWorld, vol. 15, Iss. 18, p. 64, May 3, 1993 (9 pages).

Arthur Andersen Virtual Learning Network to Focus Competency Management Through Agreement with SkiiiScape, Business Wire, Aug. 22, 2000 (3 pages).

(56) References Cited

OTHER PUBLICATIONS

CenterForce Technologies and BenchmarkPortal.com Team to Offer Comprehensive Call Center Benchmarking Solution, PR Newswire, Jan. 23, 2001 (2 pages).
Coen, Dan, Creating a Dynamic Performance Development Program, Direct Marketing, vol. 64, No. 3, p. 44, Jul. 2001 (2 pages).
Cooper, Kenneth Carlton, Effective Competency Modeling & Reporting, AMA Publications, 2000, ISBN 0-8144-0548-7 (37 pages).
Do Your Benchmarks Cover All the Media Your Company Uses, Managing Customer Service, p. 2, Mar. 1, 2001 (5 pages).
E.piphany E.6 Smart CRM Strategy of Next Generation Commerce Sites as Told by CEO Roger Siboni, Computopia, p. 58, 2002 (11 pages) (English Translation of Japanese Article).
Elwell, Ron, When You Think 'Monitoring,' Think 'John Smith,' Call Center Solutions, vol. 17, No. 12, p. 60, Jun. 1999 (5 pages).
Gillis, Marge and Katherine Beauchemin, The Ideal Rep., Pharmaceutical Executive, vol. 20, No. 12, p. 52 Dec. 2001 (7 pages).
Google home page, http:/lweb.archive.org/web/20020523134510/ http://www2.google.com/, retrieved May 23, 2002 (1 page).
Hicks, Ray, Companies Put Stock in Benchmarking, Direct Marketing, vol. 65, No. 6, p. 12, Oct. 2002 (4 pages).
Homer, Alex et al., Professional Active Server Pages, Wrox Press, ISBN 1-861000-82-3, 1997 (16 pages).
Kent, Les, Tape Backup Solutions, InfoWorld, vol. 13, Iss. 38, p. 64, Mar. 8, 1993 (2 pages).
McNichols, Chuck, Script Junkie, New.Architect, Jun. 1999 (7 pages).
Mehta, Diane and Henry McCracken, Seeing Is Believing, InfoWorld, vol. 16, Iss. 35, p. 68, Aug. 29, 1994 (3 pages).
Miciak et al., Benchmarking Service Quality Performance at Business-to-Business and Business-to-Consumer Call Centers, The Journal of Business & Industrial Marketing, vol. 16, No. 5, p. 340, MCB University Press, 2001 (14 pages).
Overview of SkiiiScape Competence Manager, SkiiiScape, 2000 (10 pages).
Pels, Mary Ann and Suzanne Wright, Benchmarking Call Center Performance, Credit Union Executive Journal, vol. 39, No. 4, p. 38, Jul./Aug. 1999 (5 pages).
Perkins, Debra S. and Jon Anton, Best Practices for Customer Service Call Centers—An Exclusive Statistical Study, Telemarketing & Call Center Solutions, vol. 15, No. 10, p. 80, Apr. 1997 (6 pages).
Shared Services, Price Waterhouse Coopers, Apr. 8, 2006 (26 pages) (English Translation of Japanese Article).
University Metes Out Data on Measuring Call Center Agents, Service News, vol. 18, No. 13, p. 2, Dec. 1998 (1 page).
Van Den Broek, Dianne, Monitoring and Surveillance in Call Centres: Some Responses From Australian Workers, Labour & Industry, vol. 12, No. 3, Apr. 2002 (15 pages).
Office Action, dated Dec. 23, 2004, issued on U.S. Appl. No. 10/305,811 (6 pages).
Office Action, dated May 23, 2005, issued on U.S. Appl. No. 10/305,811 (7 pages).
Advisory Office Action, dated Aug. 11, 2005, issued on U.S. Appl. No. 10/305,811 (3 pages).
Office Action, dated Nov. 22, 2005, issued on U.S. Appl. No. 10/305,811 (7 pages).
Office Action, dated Aug. 14, 2006, issued on U.S. Appl. No. 10/305,811 (7 pages).
Miscellaneous Office Action, dated Jul. 11, 2007, issued on U.S. Appl. No. 10/305,811 (4 pages).
Miscellaneous Office Action, dated Jul. 18, 2007, issued on U.S. Appl. No. 10/305,811 (4 pages).
Advisory Office Action, dated Oct. 14, 2008, issued on U.S. Appl. No. 10/305,811 (3 pages).
Office Action, dated Jul. 9, 2008, issued on U.S. Appl. No. 10/305,811 (9 pages).
Office Action, dated Feb. 4, 2009, issued on U.S. Appl. No. 10/305,811 (7 pages).
Office Action, dated Jul. 27, 2009, issued on U.S. Appl. No. 10/305,811 (8 pages).
Miscellaneous Action, dated Jul. 21, 2004, issued on U.S. Appl. No. 10/305,835 (2 pages).
Miscellaneous Action, dated Aug. 2, 2005, issued on U.S. Appl. No. 10/305,835 (2 pages).
Office Action, dated Sep. 9, 2005, issued on U.S. Appl. No. 10/305,835 (7 pages).
Notice of Allowance, dated Dec. 28, 2005, issued on U.S. Appl. No. 10/305,835, with Examiner-Initiated Interview Summary, dated Dec. 14, 2005 (10 pages).
Office Action, dated Jun. 22, 2007, issued on U.S. Appl. No. 10/305,858 (19 pages).
Office Action, dated Jul. 1, 2008, issued on U.S. Appl. No. 10/305,858 (16 pages).
Office Action, dated Jan. 13, 2009, issued on U.S. Appl. No. 10/305,858 (22 pages).
Office Action, dated Jun. 18, 2009, issued on U.S. Appl. No. 10/305,858 (22 pages).
Office Action, dated Oct. 22, 2009, issued on U.S. Appl. No. 10/305,858 (25 pages).
Notice of Allowance, dated Mar. 25, 2010, issued on U.S. Appl. No. 10/305,858 (7 pages).
Office Action, dated May 5, 2005, issued on U.S. Appl. No. 10/306,026 (10 pages).
Office Action, dated Oct. 14, 2005, issued on U.S. Appl. No. 10/306,026 (12 pages).
Office Action, dated Apr. 11, 2006, issued on U.S. Appl. No. 10/306,026 (13 pages).
Advisory Action, dated Aug. 22, 2006, issued on U.S. Appl. 10/306,026 (3 pages).
Office Action, dated Dec. 28, 2006, issued on U.S. Appl. No. 10/306,026 (15 pages).
Notice of Allowance, dated Aug. 8, 2007, issued on U.S. Appl. No. 10/306,026 (2 pages).
Miscellaneous Action, dated Nov. 8, 2007, issued on U.S. Appl. No. 10/306,026 (2 pages).
Office Action, dated Apr. 15, 2005, issued on U.S. Appl. No. 10/306,248 (7 pages).
Office Action, dated Oct. 20, 2005, issued on U.S. Appl. No. 10/306,248 (12 pages).
Advisory Action, dated Jan. 9, 2006, issued on U.S. Appl. No. 10/306,248 (2 pages).
Office Action, dated May 30, 2006, issued on U.S. Appl, No. 10/306,248 (10 pages).
Office Action, dated Dec. 7, 2006, issued on U.S. Appl. No. 10/306,248 (12 pages).
Advisory Action, dated May 14, 2007, issued on U.S. Appl. No. 10/306,248 (3 pages).
Office Action, dated Jul. 24, 2007, issued on U.S. Appl. No. 10/306,248 (9 pages).
Miscellaneous Action, dated May 29, 2008, issued on U.S, Appl. No. 10/306,248 (2 pages).
Examiner's Answer to Appeal Brief, dated Jan. 7, 2009, issued on U.S. Appl. No. 10/306,248 (16 pages).
Office Action, dated Apr. 15, 2005, issued on U.S. Appl. No. 10/306,386 (6 pages).
Office Action, dated Sep. 27, 2005, issued on U.S. Appl. No. 10/306,386 (9 pages).
Advisory Action, dated Dec. 7, 2005, issued on U.S. Appl. No. 10/306,386 (3 pages).
Office Action, dated Feb. 15, 2006, issued on U.S. Appl. No. 10/306,386 (7 pages).
Office Action, dated Oct. 24, 2006, issued on U.S. Appl. No. 10/306,386 (9 pages).
Office Action, dated May 30, 2007, issued on U.S. Appl. No. 10/306,386 (8 pages).
Advisory Action, dated Apr. 23, 2008, issued on U.S. Appl. No. 10/306,386 (2 pages).
Office Action, dated Jul. 7, 2008, issued on U.S. Appl. No. 10/306,386 (13 pages).
Office Action, dated Jan. 5, 2009, issued on U.S. Appl. No. 10/306,386 (12 pages).

(56) References Cited

OTHER PUBLICATIONS

Advisory Action, dated Apr. 15, 2009, issued on U.S. Appl. No. 10/306,386 (3 pages).
Office Action, dated Jul. 21, 2009, issued on U.S. Appl. No. 10/306,386 (11 pages).
Office Action, dated Jan. 22, 2010, issued on U.S. Appl. No. 10/306,386 (10 pages).
Examiners Answer to Appeal Brief, dated Jul. 19, 2010, issued on U.S. Appl. No. 10/306,386 (11 pages).
Office Action, dated Aug. 26, 2005, issued on U.S. Appl. No. 10/306,563 (8 pages).
Office Action, dated Feb. 13, 2006, issued on U.S. Appl. No. 10/306,563 (8 pages).
Office Action, dated Oct. 6, 2006, issued on U.S. Appl. No. 10/306,563 (9 pages).
Office Action, dated Jun. 28, 2007, issued on U.S. Appl. No. 10/306,563 (11 pages).
Advisory Action, dated Sep. 14, 2007, issued on U.S. Appl. No. 10/306,563 (3 pages).
Notice of Allowance, dated Jun. 6, 2008, issued on U.S. Appl. No. 10/306,563 (4 pages).
Notice of Allowance, dated Dec. 23, 2008, issued on Application No. 10/306,563 (2 pages).
Office Action, dated May 3, 2005, issued on U.S. Appl. No. 10/306,564 (8 pages).
Office Action, dated Oct. 13, 2005, issued on U.S. Appl. No. 10/306,564 (11 pages).
Advisory Action, dated Jan. 17, 2006, issued on U.S. Appl. No. 10/306,564 (3 pages).
Office Action, dated Jun. 13, 2006, issued on U.S. Appl. No. 10/306,564 (10 pages).
Office Action, dated Jan. 22, 2007, issued on U.S. Appl. No. 10/306,564 (12 pages).
Advisory Action, dated Apr. 16, 2007, issued on U.S. Appl. No. 10/306,564 (3 pages).
Office Action, dated Jul. 24, 2007, issued on U.S. Appl. No. 10/306,564 (9 pages).
Office Action, dated Mar. 13, 2008, issued on U.S. Appl. No. 10/306,564 (3 pages).
Office Action, dated Jun. 9, 2008, issued on U.S. Appl. No. 10/306,564 (15 pages).
Office Action, dated Nov. 26, 2008, issued on U.S. Appl. No. 10/306,564 (16 pages).
Advisory Action, dated Mar. 18, 2009, issued on U.S. Appl. No. 10/306,564 (3 pages).
Office Action, dated Jun. 2, 2009, issued on U.S. Appl. No. 10/306,564 (14 pages).
Office Action, dated Dec. 17, 2009, issued on U.S. Appl. No. 10/306,564 (13 pages).
Examiners Answer to Appeal Brief, dated Aug. 5, 2010, issued on U.S. Appl. No. 10/306,564 (1 page).
Office Action, dated Apr. 20, 2005, issued on U.S. Appl. No. 10/306,577 (6 pages).
Office Action, dated Oct. 3, 2005, issued on U.S. Appl. No. 10/306,577 (5 pages).
Advisory Action, dated Dec. 29, 2005, issued on U.S. Appl. No. 10/306,577 (3 pages).
Office Action, dated May 4, 2006, issued on U.S. Appl. No. 10/306,577 (6 pages).
Notice of Allowance, dated Dec. 5, 2006, issued on U.S. Appl. No. 10/306,577 (12 pages).
Office Action, dated Jan. 10, 2007, issued on U.S. Appl. No. 10/306,705 (7 pages).
Advisory Action, dated Dec. 18, 2007, issued on U.S. Appl. No. 10/306,705 (3 pages).
Office Action, dated Mar. 19, 2008, issued on U.S. Appl. No. 10/306,705 (10 pages).
Office Action, dated Oct. 14, 2008, issued on U.S. Appl. No. 10/306,705 (13 pages).
Office Action, dated Apr. 27, 2009, issued on U.S. Appl. No. 10/306,705 (12 pages).

\* cited by examiner

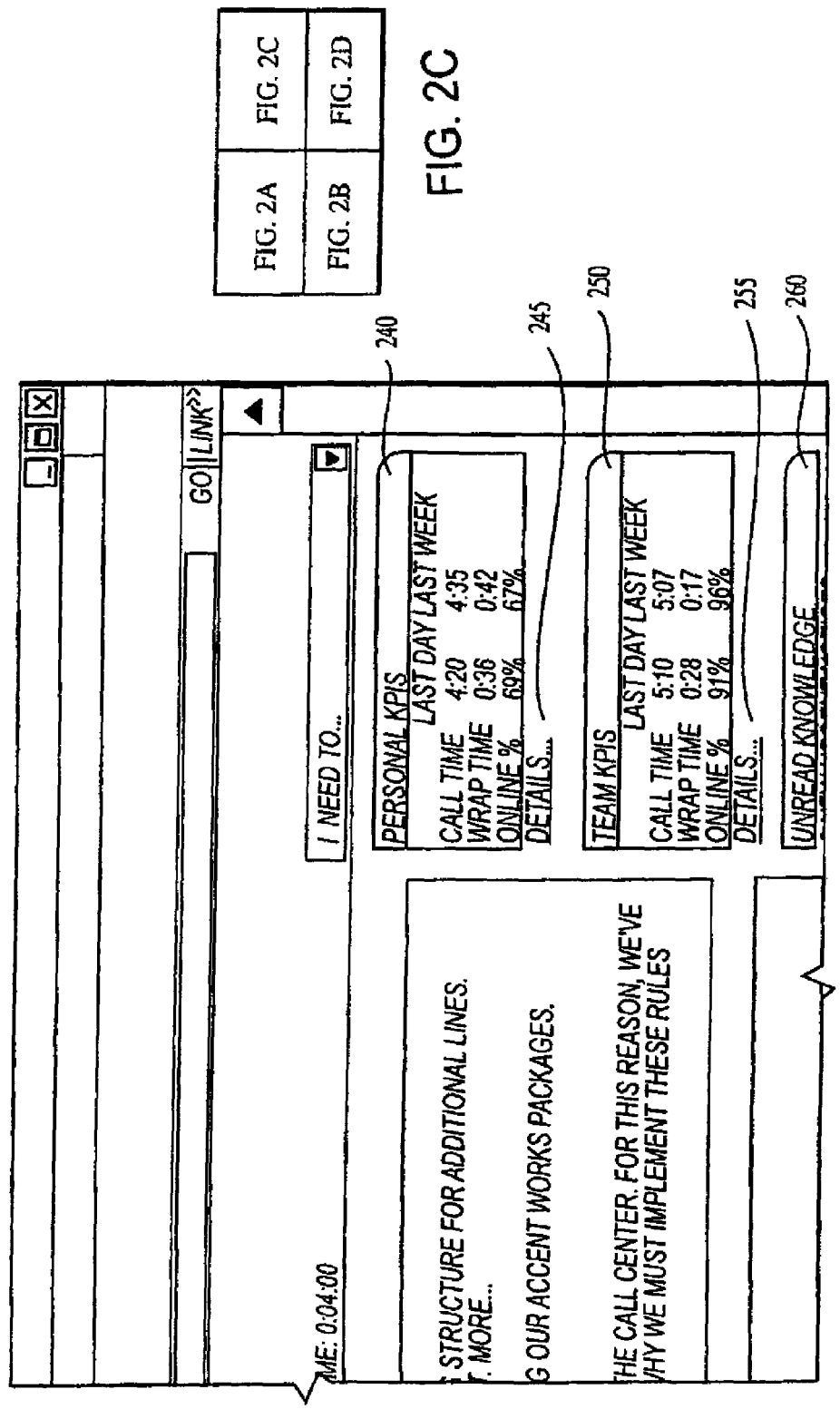

FIG. 2D

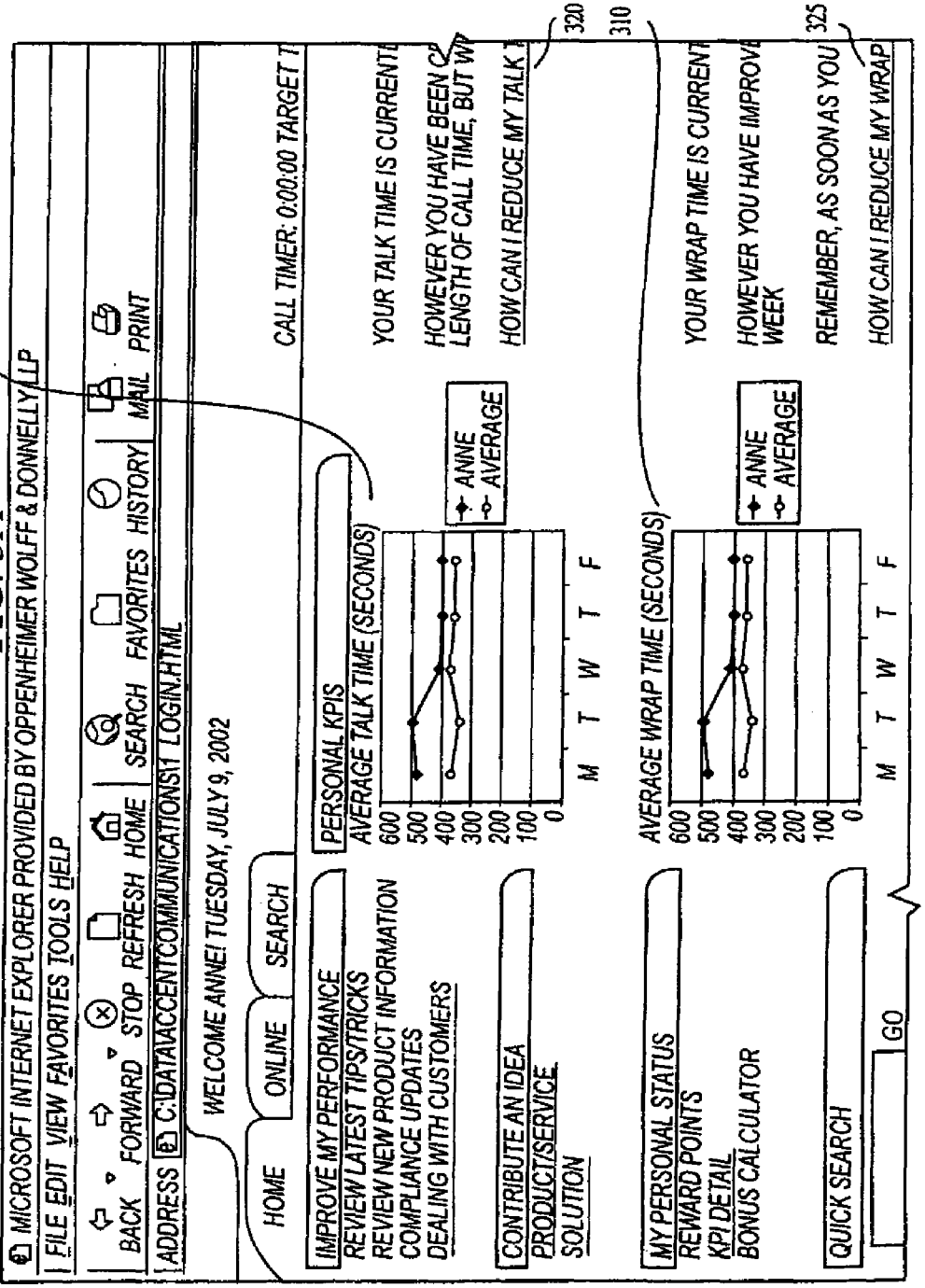

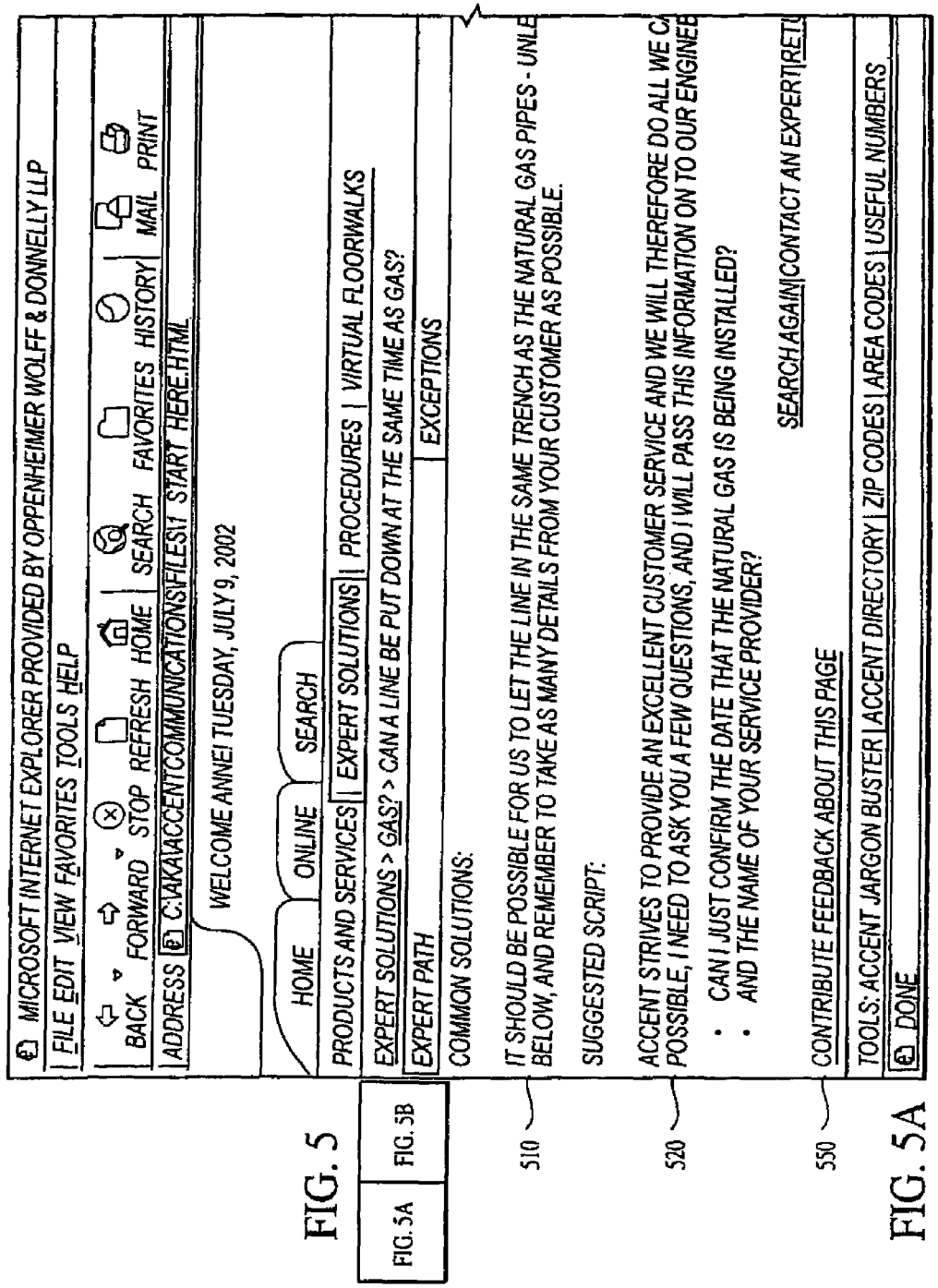

BONUS CALCULATOR

ADDITIONAL LINES ARE IDEAL FOR OUR CUSTOMERS WHO WORK FROM HOME O
ADDITION, CUSTOMERS WHO HAVE A TEENAGER/OTHER FAMILY MEMBER ALWAY
FROM THIS EXTENDED SPECIAL OFFER.

QUICK SEARCH [      ] GO

PLEASE NOTE THAT ACCENT ANYTIME CUSTOMERS BENEFIT FROM AN ADDITIONA
CHECK OUT THE ACCENT ANYTIME PRODUCT INFORMATION.

HELPFUL LINKS
RETAIL.ACCENT.COM
WWW.ACCENT.COM
WWW.GROUPAC.COM
DIRECTORY.ACCENT.COM

ACTIONS
FOR MORE INFORMATION ON ADDITIONAL LINES, CLICK HERE TO GO TO THE PR

I HAVE READ AND UNDERSTAND THIS NOTICE

TAKE THE QUIZ
PREVIOUS | NEXT

710

TOOLS: ACCENT JARGON BUSTER | ACCENT DIRECTORY | ZIP CODES | AREA CODES |

FIG. 7B

| FIG. 7A | FIG. 7C |
| FIG. 7B | FIG. 7D |

FIG. 7

QUIZ

CONTACT CENTER SYSTEM | QUIZ (1) WHICH OF THE FOLLOWING IS NOT A REQUIREMENT FOR A NEW CUSTOMER TO THE ACCENT DIGITAL PACKAGE?

○ THE CUSTOMER MUST BE WITHIN COVERAGE AND ABLE TO RECEIVE ALL OF ACCENT DIGITAL'S DIGITAL TELEVISION SERVICES.
○ THE CUSTOMER MUST PASS A CREDIT CHECK BY ACCENT DIGITAL.
○ THE CUSTOMER MUST HOLD A VALID SEASON TICKET TO AN NFL TEAM (2) TRUE OR FALSE - THIS OFFER IS OPEN TO OUR CUSTOMERS AS PART OF OUR DEAL WITH ACCENT DIGITAL

○ TRUE
○ FALSE (3) IF CUSTOMERS CHOOSE ACCENT DIGITAL, HOW MUCH WILL THEY GET TO SPEND ON PROGRAMMING AS AN ACCENT CUSTOMER?

○ $10
○ $100
○ $30

| SNOOZE | SKIP | SUBMIT |

FIG. 8

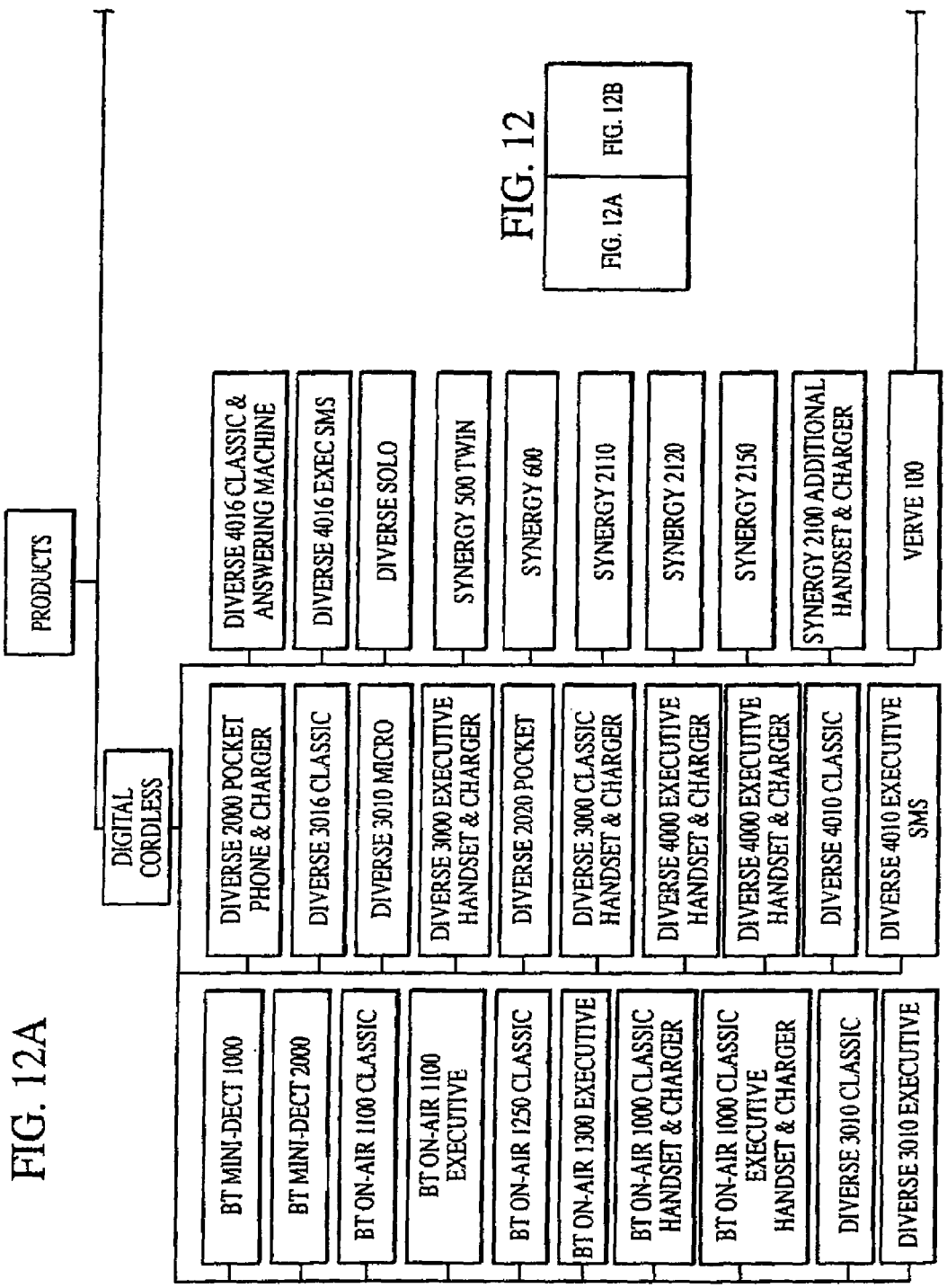

| ? ADVISORHOME | ? ONLINE |

FIND BY...

? SEARCH
ENTER SEARCH TEXT HERE
[GO] SEARCH OPTIONS ☐

? CATEGORY
PRODUCTS >>
SERVICES >>
CAMPAIGNS >>
PROCEDURES >>

? A-Z
A B C D E F G H I
J K L M N O P Q R
S T U V W X Y Z #

? CUSTOMER NEEDS
3RD PARTY BILLING

? KEYWORD
[CHOOSE KEYWORD ▼]

? ALERTS

CLICK HERE!!!

---

? PRODUCT COMPARISON | ? ONLINE > SEARCH BY FEATURE (PRODUCT NOT SELECTED) TYPE OF PRODUCT
WITH
(PRODUCT NOT SELECTED) [DIGITAL CORDLESS PHONES ▼]

KEY FEATURES 2020  2010

☑ BUILT-IN DIGITAL ANSWERING MACHINE      ☐ MULTI-HANDSET FACILITY

☐ ALPHA NUMBERIC MEMORY      ☑ CALLER DISPLAY      ☐ PRE-RECORDD OUTGOING MESSAGE

☑ RANGE UP TO 300M OUTDOORS      ☑ LIQUID CRYSTAL DISPLAY      ☐ HEARING AID COMPATIBLE      ☐ PRIVATE PLAYBACK (VIA HANDSET)

[GO]

SEARCH RESULTS

DIVERSE 3016 CLASSIC [COMPARE]
THE DIVERSE 3016 CLASSIC IS A FULLY DIGITAL CORDLESS PHONE AND COMBINED ANSWERING MACHINE OFFERING 15 MINUTES OF RECORDING AND CALLER DISPLAY (A SEPARATE QUARTERLY FEE IS PAYABLE)

2015 — SYNERGY 2150 [COMPARE]
A FULLY DIGITAL CORDLESS PHONE AND ANSWERING MACHINE WITH UP TO 22 MINUTES RECORDING TIME

BT ON-AIR 1300 EXECUTIVE [COMPARE]
BT ON-AIR 1300 EXECUTIVE, WITH BUILT IN ANSWERING MACHINE WITH UP TO 15 MINUTES RECORDING TIME, ALLOWS FOR HANDS FREE CALLS THAT COULD BE SCREENED USING THE CALLER DISPLAY HAS A 50 NAME AND NUMBER STORAGE WITH DATE/CLOCK/ALARM AND CALL TIMING FEATURES.

---

? TOOLS: FARGON BUSTER | LOCAL CALL AREAS | POSTCODES | CALL PRICES | PAY BY PHONE      BT INTRANET A-Z | 150 ADVISOR DESKTOP

FIG. 20

| | DIVERSE 3016 CLASSIC VIEW | | SYNERGY 2150 VIEW | |
|---|---|---|---|---|
| COMPARING DIVERSE 3016 CLASSIC WITH SYNERGY 2150 | PRICE INCL. VAT £109.99 | PRICE EXCL. VAT £93.61 | PRICE INCL. VAT £99.99 | PRICE EXCL. VAT £85.10 |
| 120 DYNAMIC CHANNEL ALLOCATION | ✓ | | ✓ | |
| ADDITIONAL CORDED EXTENSION | ✗ | | ✗ | |
| ADDITIONAL HANDSETS | ✗ | | ✗ | |
| ALPHA NUMERIC MEMORY | | | 20 | |
| AUTO-TALK STANDBY | ✓ | | ✓ | |
| BACKLIT KEYPAD | ✗ | | ✗ | |
| BASE STATION RINGER VOLUME CONTROL | ✓ | | ✓ | |
| BASE STATION/HANDSET SYSTEM SECURITY (PIN CODE) | ✓ | | ✓ | |
| BATTERY LOW WARNING | ✓ | | ✓ | |
| BATTERY STANDBY TIME (HOURS) | 100 | | 150 | |
| BATTERY TALKTIME (HOURS) | 10 | | 15 | |

CREATE CONTENT ITEM

SELECT FAMILY: PRODUCT ▼
2705 — SERVICE
CAMPAIGN
PROCEDURE
JARGON BUSTER ITEM

SELECT CATEGORY: CORDLESS ANALOGUE ▼
CORDLESS DIGITAL
CORDED ANALOGUE
CORDED DIGITAL
ETC.

TITLE: 2710 — < TYPE PRODUCT NAME HERE >

WRITER: BOB BARKER ▼
2715 — TRACEY TURNER
MAUREEN MIDDLETON
PETER PHILLIPS

REVIEWER: CHRIS CARTER
SUE SIMONS
RICHARD ROGERS
CAROLINE COOPER

SELECT KEY WORDS:
2720 — INTERNET
ISDN
HIGH SPEED LINE
HOMEMOVER
ETC.
▲ ▼
INTERNET

COMISSION DATE: 10/12/01
WRITE BY DATE: 20/12/01
PUBLISH BY DATE: 20/12/01
EXPIRY DATE: 20/12/01

SELECT INTENTIONS:
2725 — MOVING HOME
BILLING
▲ ▼
BILLING

SAVE THIS CONTENT ITEM
BACK TO HOME PAGE

REVIEWER HOME PAGE

WELCOME <NAME OF REVIEWER>! YOU HAVE 5 NEW TASKS...

ACTIONS

SELECT ACTION:
REFRESH TASK LIST
WRITE NEW NOTICE

TASKS

| DESCRIPTION | DUE DATE | STATUS |
|---|---|---|
| REVIEW CONTENT - HOME HIGHWAY - OVERVIEW/HIGHLIGHTS | 21/12/01 | SUBMITTED |
| REVIEW CONTENT - HOME HIGHWAY - IDEAL FOR... | 21/12/01 | SUBMITTED |
| REVIEW CONTENT - HOME HIGHWAY - FULL DESCRIPTION | 21/12/01 | SUBMITTED |
| REVIEW CONTENT - HOME HIGHWAY - BENEFITS | 21/12/01 | SUBMITTED |
| REVIEW CONTENT - HOME HIGHWAY - RECAP | 21/12/01 | SUBMITTED |

FIG. 28

CONTENT FEEDBACK IN A MULTIPLE-OWNER CONTENT MANAGEMENT SYSTEM

CROSS REFERENCE TO RELATED APPLICATIONS

The present application is a continuation of U.S. application Ser. No. 12/179,429, filed Jul. 24, 2008 (allowed), which is a continuation of U.S. application Ser. No. 10/306, 025 filed Nov. 27, 2002, now issued U.S. Pat. No. 7,418,403, issued Aug. 26, 2008, both of which are incorporated herein by reference in their entirety.

BACKGROUND OF THE INVENTION

Rapid advances in technology have created computerized tools that enable companies to better interact with their customers. Such tools are one component of Customer Relationship Management ("CRM"), a management philosophy in which a primary theme is the value of building equity in the relationships with customers. As this relationship equity builds, the customer's attachment and loyalty to the company increases, the likelihood that the customer will switch to a competitor decreases, and the company's sales to that customer inevitably increase.

The Internet Age has increased customers' expectations about the ease and speed with which activities should be handled. While the average United States company loses 15%-20% of its customer base each year, high churn sectors—such as telecommunications and airlines—can have up to a 40% annual customer attrition rate. Keeping customers relies, in part, on maintaining their loyalty and building relationship equity. To improve customer satisfaction, and therefore customer loyalty, call center computer systems should maximize the representative's ability to serve customers. Historically, traditional call centers only handled telephone calls from customers. To offer better service, newer contact centers allow representatives to perform sales, service, and support functions with customers via many communication channels, including telephone, fax, e-mail, web, and IVR ("interactive voice response").

The enhanced functionality of such contact center computer systems assists representatives in being more efficient in dealing with customers. This is economically important since labor costs make up more than 60% of a contact center's operating budget. For a typical company spending $500 million annually on customer interaction, shaving just one second off the average length of a customer contact can save $1 million each year.

What is needed in the art is a contact center that includes enhanced processes and computerized systems that work to enhance the service to customers and the efficiency in doing so. The solution should integrate with existing contact center tools to leverage software that is either available from third party vendors or that has already been developed in-house. In addition to improving the computer systems of contact centers, there is a need to improve the human performance aspect of the centers.

SUMMARY OF THE INVENTION

In a multiple-owner content management system (such as one used by a contact center user), a database storing a set of content items may be provided, in which each content item is associated to its content-owner. A user may submit feedback for one of the content items. That feedback may be routed to the content-owner associated to the content item without requiring the user to know or to determine who the content-owner is. The content owner may be: a content author, a content manager, an advocate for the content owner, or a team of people. The feedback may be a comment explaining any errors in the content item, a rating of the usefulness of the content item, or a comment for content improvement.

BRIEF DESCRIPTION OF THE DRAWINGS

FIG. 8 is a screen shot of the Contact Center System quiz function.
FIGS. 19 and 20 are screen shots showing the Search by Feature function.
FIG. 21 is a screen shot showing the Product Comparison feature.
FIG. 22 is a screen shot showing the content displayed from a category search for a service.
FIG. 27 is a screen shot of the Content Management System, where a new content item is being set up.
FIG. 28 is a screen shot of the Content Management System where a task list has five assigned tasks.

DETAILED DESCRIPTION OF THE INVENTION

Figure 1:
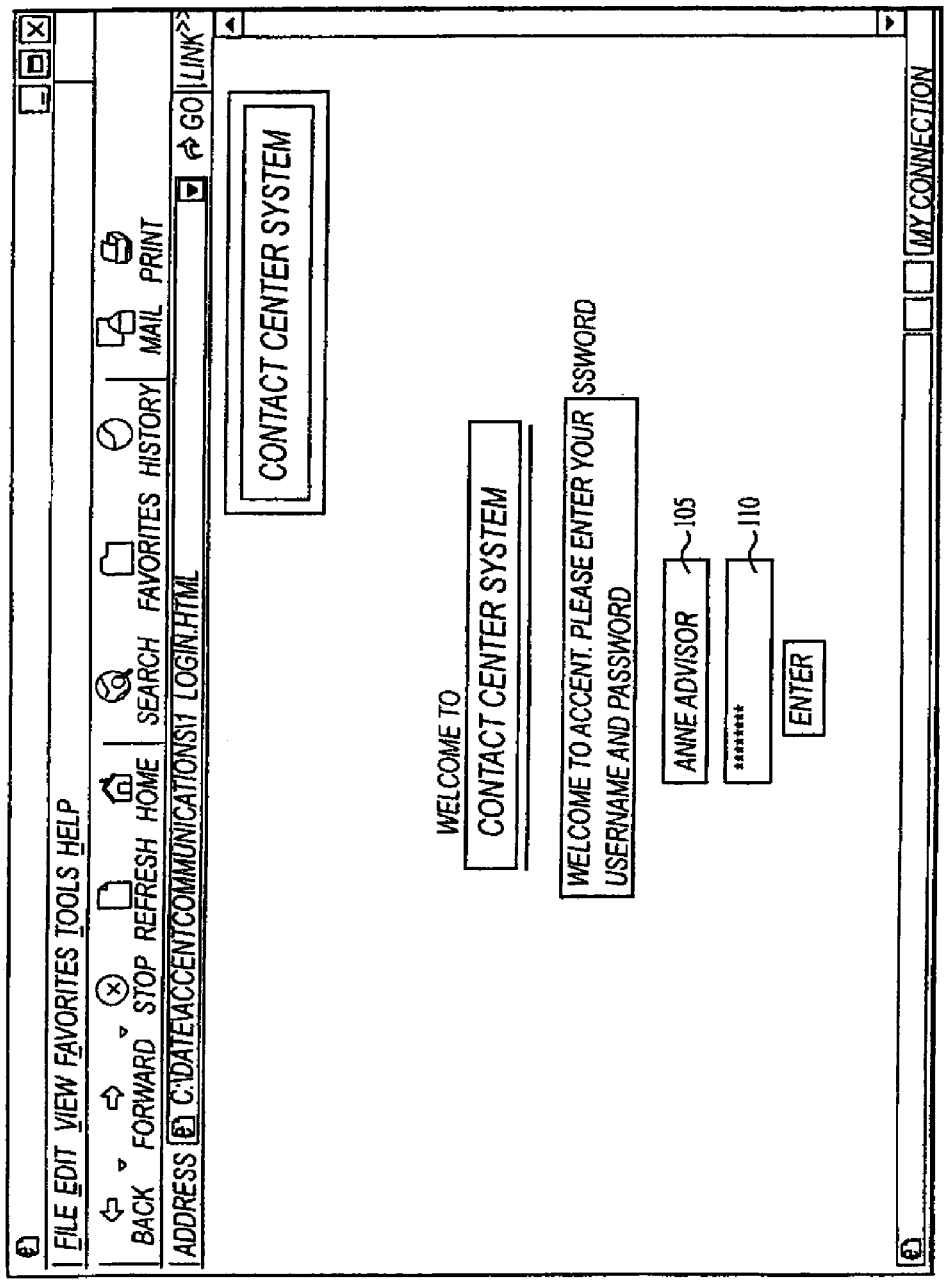
FIG. 1 is a screen shot of the login screen of the web-based Contact Center System.

FIGS. 1 through 10 show the web pages for a web-based contact center system ("CCS") that demonstrates one example of numerous implementations of the present invention. FIG. 1 is the web page by which the CCS users can enter the contact center system portal. To keep the CCS secure and consolidate multiple login processes to all systems necessary to support the Customer Contact Center support role, a user is prompted once for his or her username 105 and password 110. Throughout this description, since the CCS is directed primarily to representatives in a contact center, the terms representative and user are used synonymously. However, because certain aspects of the system include authoring, reviewing, and publishing content for use in the contact center, the term user is also used to refer to people performing those tasks as well.

The Home Page and an Overview of the System's Features

Figure 2A:
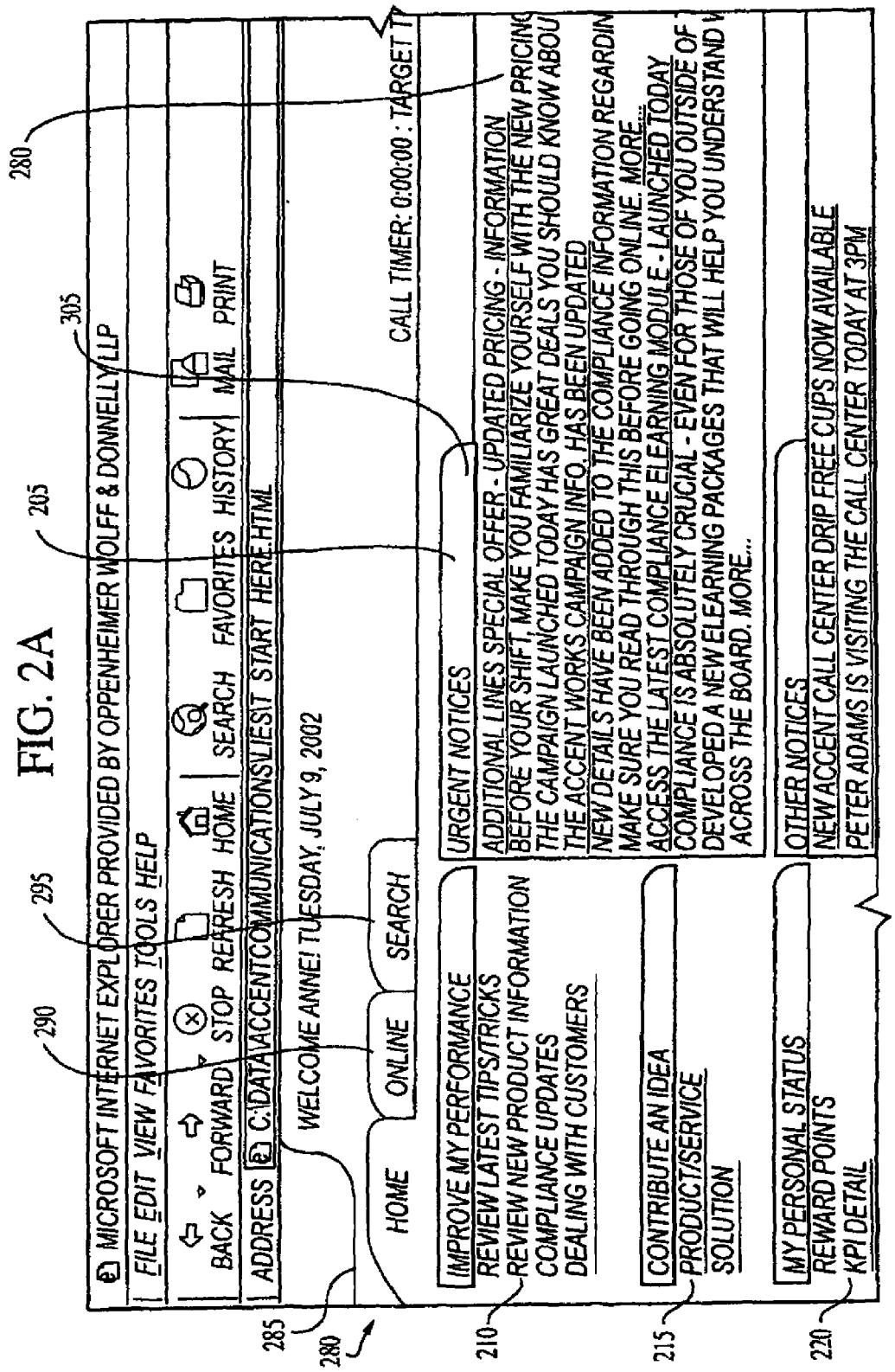
FIG. 2 is a screen shot of the homepage for the Contact Center System.
Figure 2B:
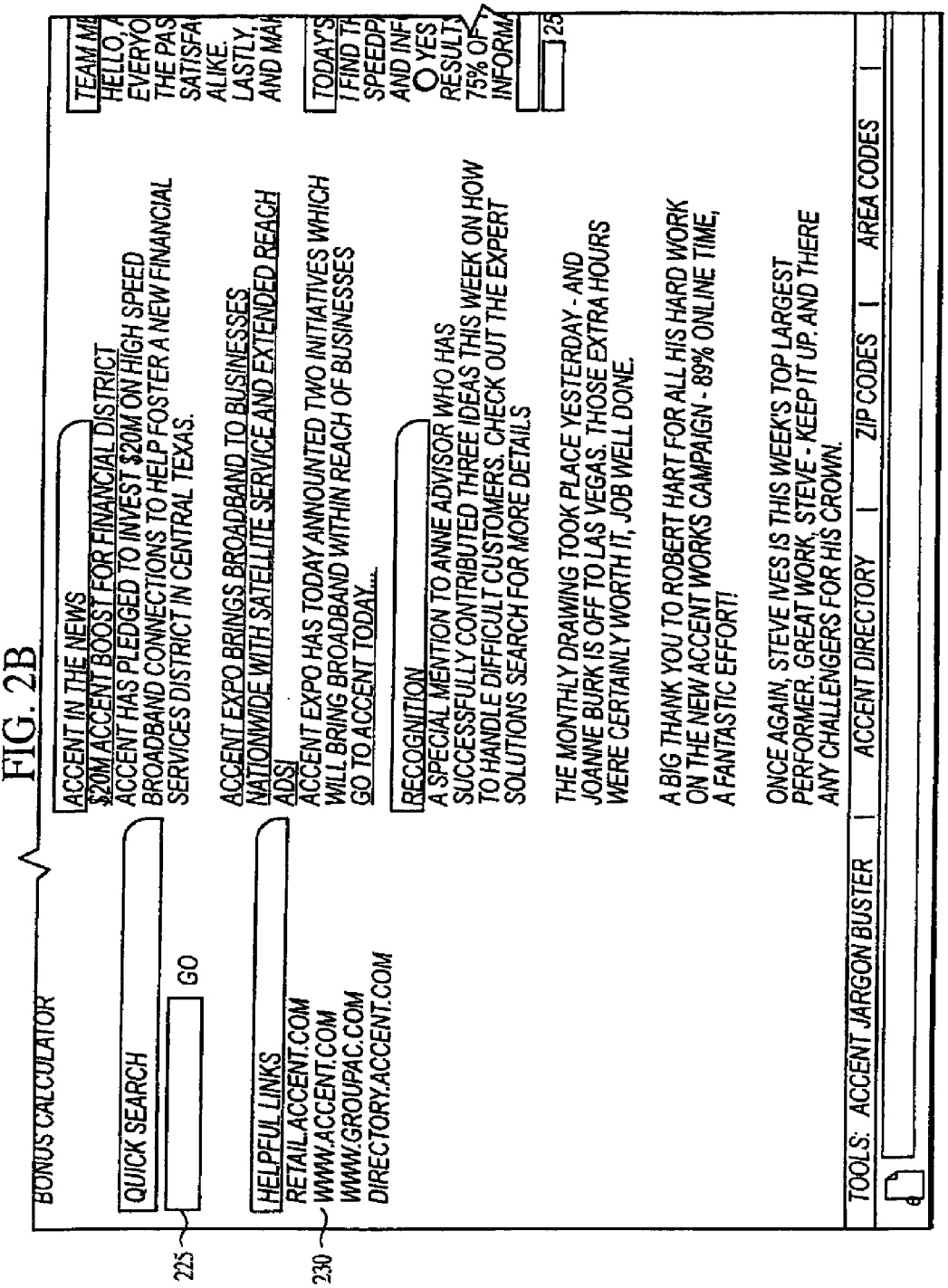
Figure 2D:
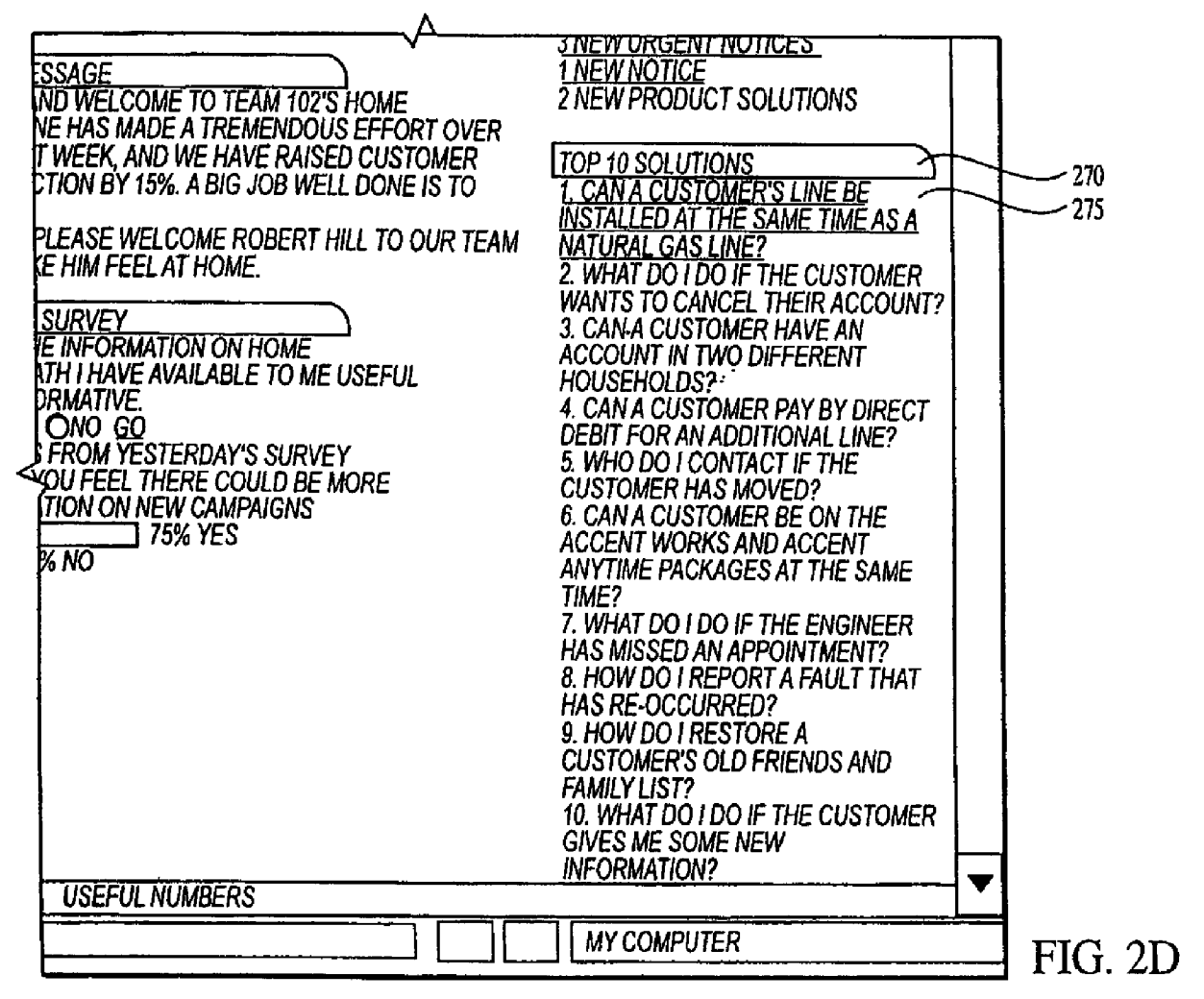

FIG. 2 shows the contact center home page, which consists of several organized regions. It is from this home page that the contact center representative accesses the system's various functions. While several functions will be highlighted in the discussion of FIG. 2, further details for these functions will be described in view of the subsequent figures.

In one embodiment of the home page, the page is presented as a set of tabbed pages, labeled as Home 285, Online 290 and Search 295. This arrangement of tabs allows a user to navigate between online and offline information, depending on whether or not the user is working with a customer or contact. When online, the "online" tab is clicked by the user and he or she has access to the contact center screens as well as supporting reference material. When using the offline feature, the user clicks the "home" or "search" tab for additional reference materials or for role-based capability enhancement (such as training, reading notices, checking KPI statistics, etc.) In prior systems, multiple applications were installed on the user's PC. Some applications were directed to online activities while others were directed to offline activities. The dual information capability enabled by the CCS's tabs allows a user to run only one application window of the browser program instead of multiple windows, thus increasing system performance. Since the offline and online functionality is highly integrated, certain embodiments of the present invention can leverage the integration by customizing the offline content based on what the user has recently done online. For example, when a representative user works with a customer online, but neglects to attempt to up-sell new services to the customer, when the user then goes offline, the system automatically can offer training to the user about how to properly up-sell services. The system may also proactively offer content to the user regarding upselling and customer services potential for the specific client.

At the top center of the page urgent notices 205 can be displayed, which detail important new information of which a user should be aware in performing his or her job. For example, in the sample page shown in FIG. 2, there are three notices: one about updated pricing, one about the Accent Works sales campaign, and one about a learning module. As is often the case in web pages, the representative clicks on the title of the notice or the "More . . . " link 280 to receive full information about the notice. These notices are dynamic and may change regularly.

Along the left side of the web page, there are five boxes containing links to other some of the system's features or to informational webpages (either within a corporate intranet, or to external websites). These links include those to improve a user's performance via eLearning or microlearning techniques 210, to contribute an idea to improve products, services or to solutions of a problem 215, to review information about the user 220, to perform a search of the CCS 225, or to connect to other helpful informational links 230.

Along the right side of the web page shown in FIG. 2 are four regions. The first two summarize information that reflects key performance indicators (KPIs) for both the user individually 240 and the user's team or other parts of the user's organization 250. The "Details . . . " links 245 & 255 access pages that provide further information about these KPI statistics. Below the KPI information regions, there is a region listing unread information pertinent to the user 260 (which may outline the content that the user has yet to read or review and will reduce the need to search for new content regularly) followed by a region that lists the most common solutions to questions faced by customers or contacts 270.

The web page of FIG. 2 also shows regions for call time, target time, news items, recognition information, team messages, and a survey. It also includes links to tools, such as a jargon dictionary, a directory, ZIP code and area code utilities, and useful phone numbers. It may also be personalized for the user as evidenced by the message in the top left corner greeting the user on the home page, as well as targeted content in the message areas.

Key Performance Indicators and Capturing Insight

Figures 3, 3B:
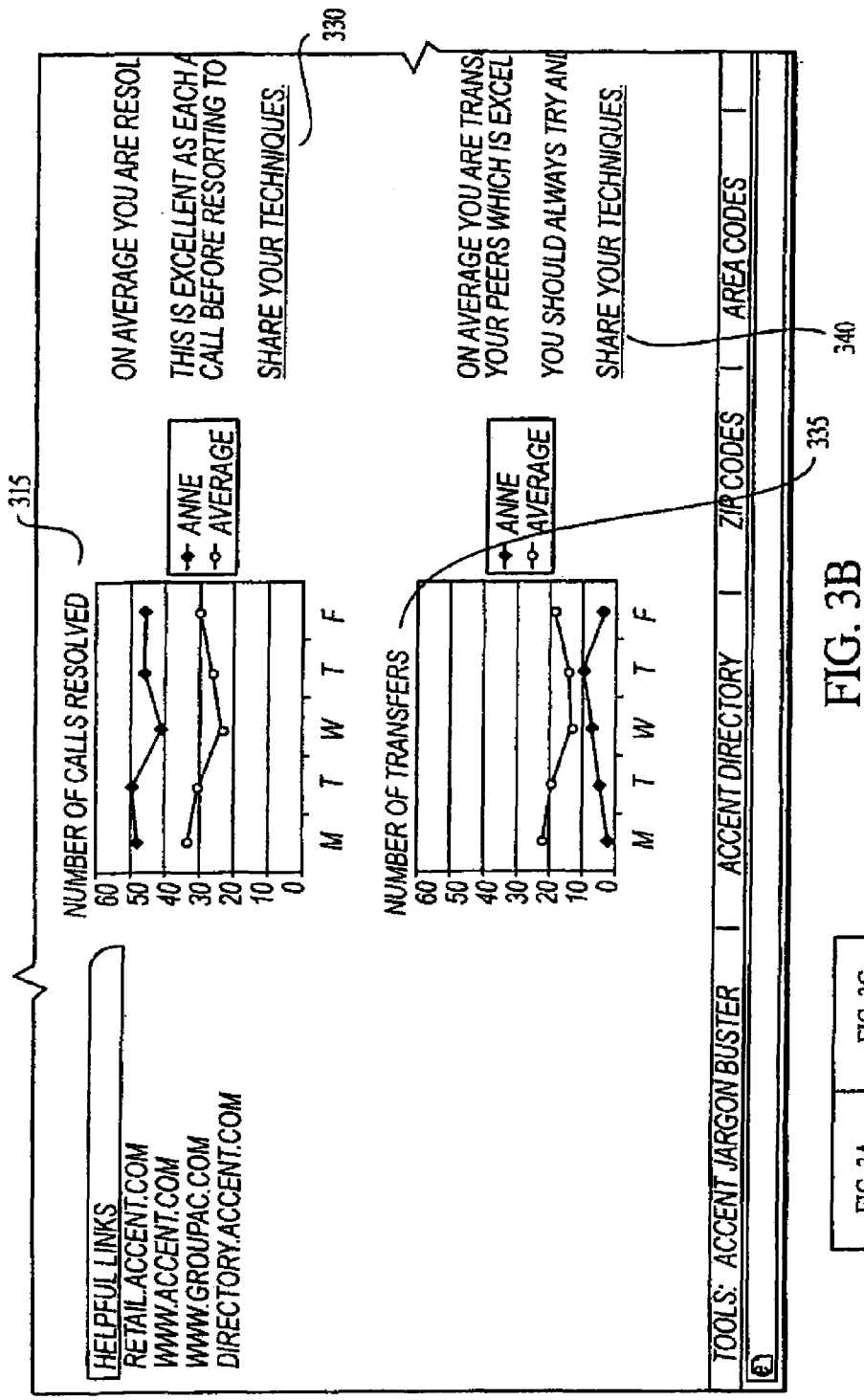
FIG. 3 is a screen shot of the KPI details page for the Contact Center System.
Figure 3C:
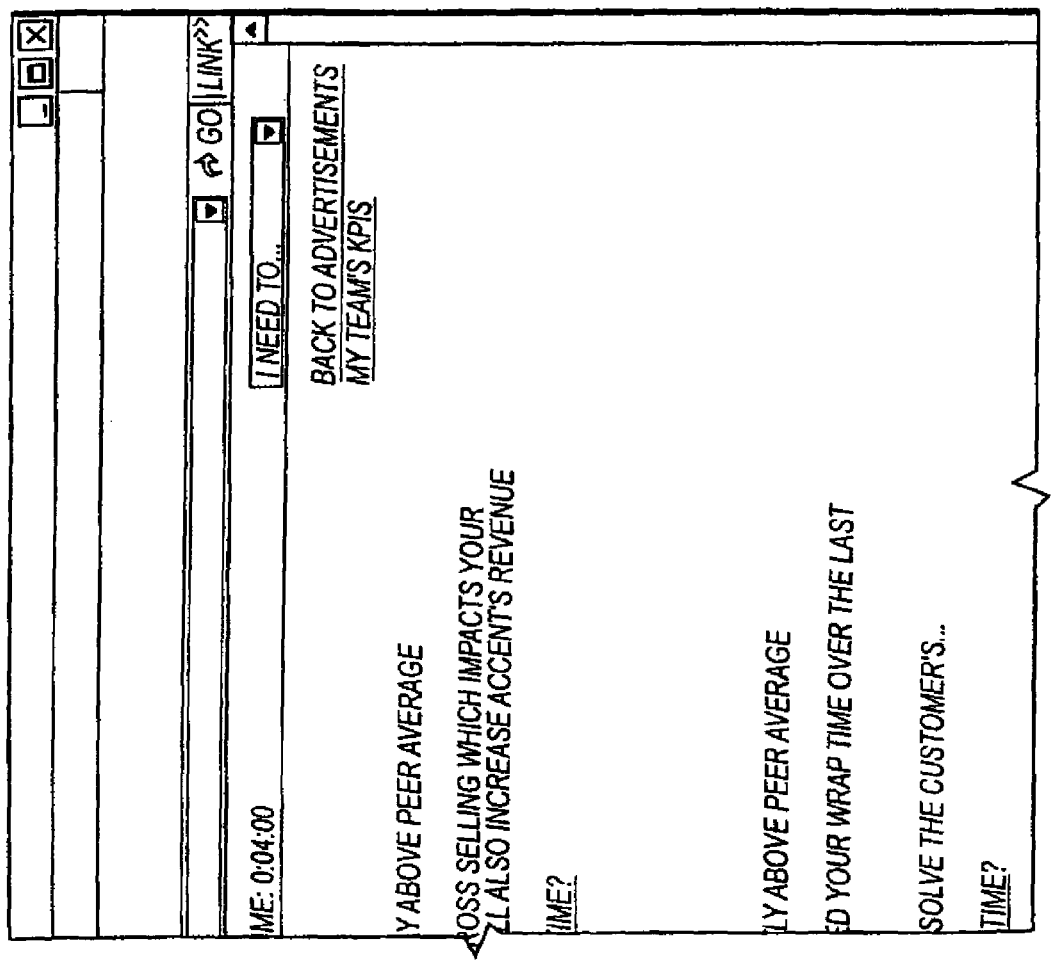
Figure 3D:
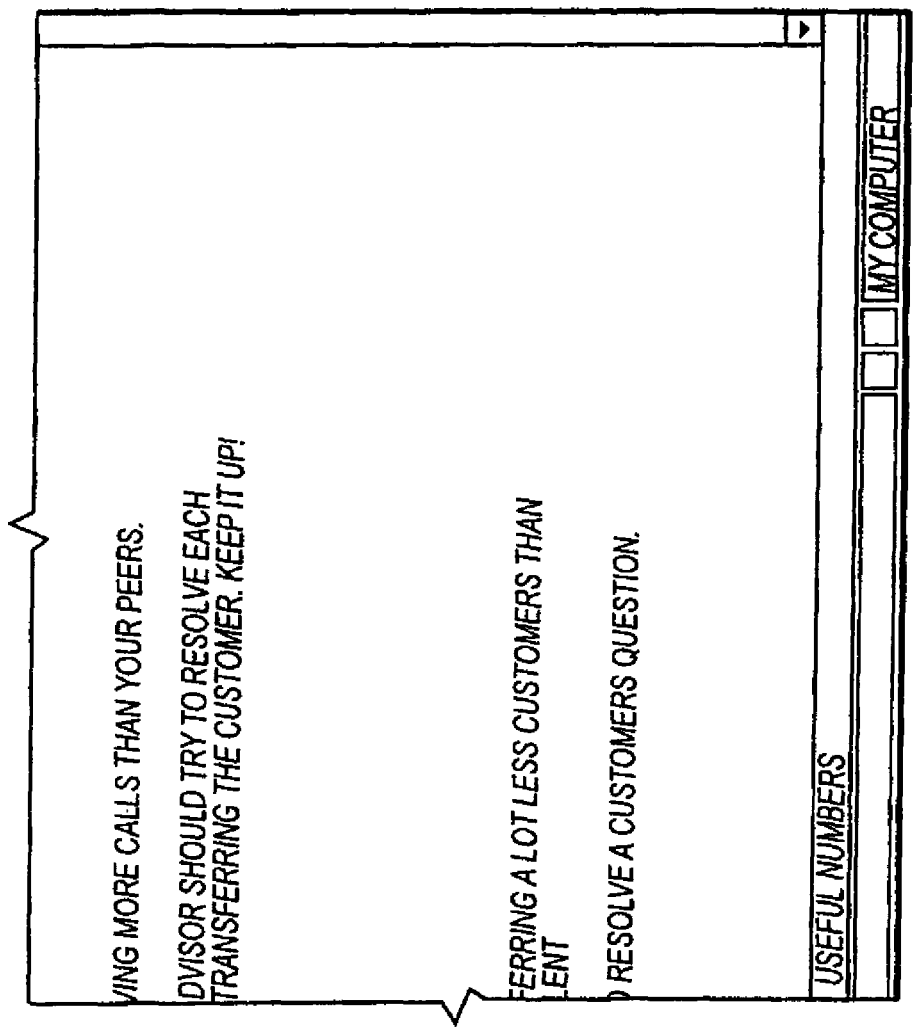
Figure 4:
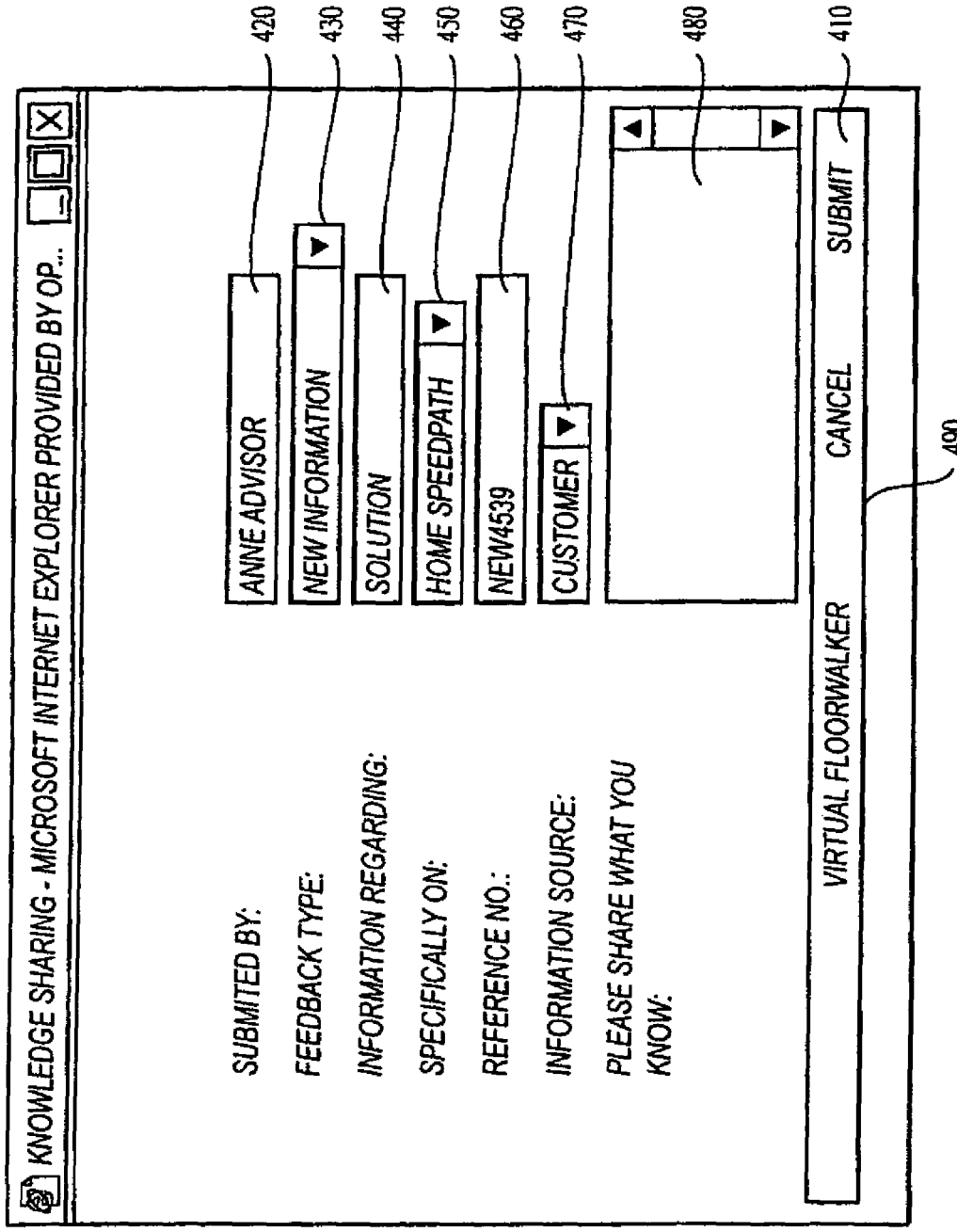
FIG. 4 is a screen shot of the knowledge sharing utility of the Contact Center System.

FIG. 3 is the detailed page displayed to the user after he or she clicks on the "Details . . . " link from the home page 245. While the key performance indicators vary depending on the implementation and use of the contact center, FIG. 3 shows four common KPI's: the average talk time in seconds, the average wrap time in seconds, the number of calls resolved and the number of calls requiring a transfer. For comparison purposes, the user's individual KPI statistics are charted against a reference number. In FIG. 3, that reference is the team average. In other embodiments, the base reference could be the user's rating from a previous period, or a pre-determined objective, for example. A textual explanation of each chart is provided to the right of the chart.

For every call attended to by a user, the system records data about that call, which is used to calculate the statistics shown in FIG. 3. (One skilled in the art will understand that such data capture and statistical calculations can be done programmatically in a number of ways.) The CCS compares the user's KPIs to the team's performance averages (or other base figure). If the user is performing at some pre-established level—such as above the team average, a certain percentage above the median or mean, a standard deviation above the median or mean, etc.—then the system automatically provides a link 330 asking the user to share his or her insight on what causes such good performance. Clicking on that link 330 or 340 opens a window (FIG. 4), into which the user enters information regarding how he achieves such superior performance levels. Upon clicking the submit button 410, the system stores this information. The insight gained from the high performing users can be used in many ways. In one example, information gleaned from these submissions is used to create an informational message that is presented to users that are not performing in such a superior fashion. This type of message is displayed when a user clicks on links such as 320 and 325 from FIG. 3. The KPI comparisons are used to motivate users to perform better. They are also used to gather insight from good users and to offer training moments to underachievers.

Finding Solutions to Common Issues

Returning to FIG. 2, CCS provides a Top Ten Solutions box 270. This solutions box provides the CCS user with instant access to the solutions that have been most often accessed by all CCS users or solutions that are considered critical by Contact Center management. Thus, it presents a quick way to use the home page to present the most used information without cluttering it with solutions that are rarely accessed. Of course, while FIG. 2 shows 10 solutions, the number can be changed to another number without impacting the spirit of the invention. While the solutions shown in this region 270 can be manually chosen by administrators, in one embodiment of the CCS, the solutions are dynamically arranged. That is to say, a solution's rank is a function of the frequency and/or recency by which that solution has been accessed within some defined period of time. To maintain this dynamically changing list of solutions, the system stores data about each solution, including for example the last date on which the solution was accessed, the number of times each particular solution was accessed on each particular date, etc. This data is then evaluated by the system to rank all solutions, displaying the top ten solutions in the top solutions box 270 shown in FIG. 2. Therefore, the listing reflects those solutions of most recent interest to the users and/or of most frequent interest to the users.

There are numerous ways to implement this dynamic list. In one embodiment, the ranking of the solutions is calculated each night. In another embodiment, the list is refreshed every hour. The list can even be re-ranked each time a solution is accessed. This method has the advantage that the list closely mirrors the problems currently being researched by the representatives. If an unexpected emergency occurs, while the system administrator can post an urgent notice 205 to the home page, the solution to the problem will quickly bubble up the rankings as more and more CCS representatives search for the solution.

Figure 5B:
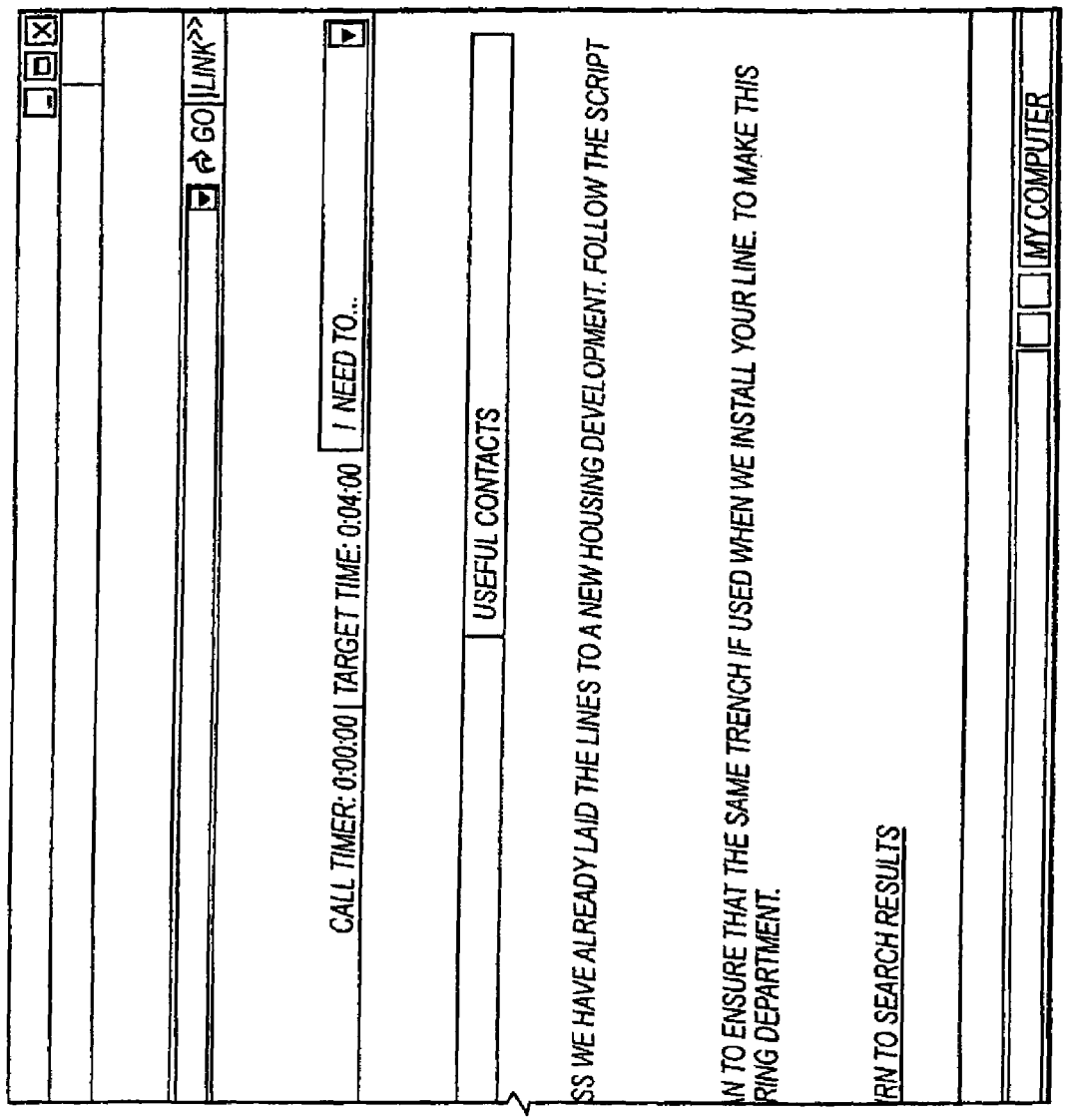
FIG. 5 is a screen shot of the Expert Solutions area of the Contact Center System.

In the embodiment of the solutions list shown in FIG. 2, the title of each solution displayed in the top solutions box 270 is itself a link 275 to more information on that solution. A user clicks on that solution title, and is taken to a separate web page, of which one embodiment is displayed in FIG. 5. The information presented in FIG. 5 is arranged in at least one embodiment through an Expert Solutions taxonomy. For each industry supported by a CCS, the goods or services serviced have a unique arrangement of dependencies, relatedness, and issues. The Expert Solutions taxonomy provides a structured presentation to the CCS user of information to solve the problems presented by customers. The taxonomy (a.k.a. content architecture) is based on the patterns of the types of data and should be intuitive to the CCS representatives.

FIG. 5 shows a link at the bottom of the web page 550 that encourages the user to contribute feedback. By clicking the link, the user can then type a comment explaining any errors in the content, rating the usefulness of the content, adding comments for content improvement, etc. The CCS routes this feedback to the content-owner or an advocate for the content owner. This system is advantageous over the prior art. In traditional systems, the end users of a CCS may get frustrated when they are faced with inaccurate information in the system. If the user is not empowered to correct these mistakes, the user's confidence in the system wanes and other users continue to be presented with the inaccurate information. Some systems list a central contact for all users to call or e-mail regarding problems with the system. The contact person may receive dozens of comments or questions daily and thus may be unable to keep up with the requests. When the contact person works to correct a mistake in the content, that person must determine which author, reviewer, manager, or team is responsible for that particular element of content. This is a burdensome task that is been addressed with this invention.

The present invention associates content items in the CCS to the various content owners. The owners may be the original authors, a team, a manager, a copy editor, etc. The system does not require the end user to find out who the proper content owner is. Rather, when the user submits feedback, the system automatically sends the information to the proper party.

Figure 6:
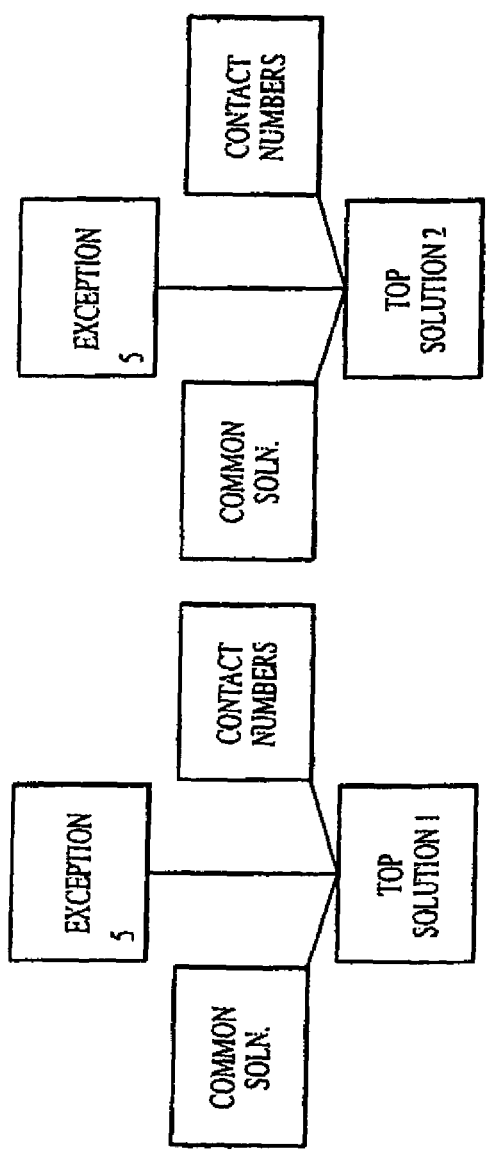
FIG. 6 is a hierarchical representation of how solution content is categorized.

The taxonomy used in the CCS shown in the figures groups information for a solution into several headings, including one section detailing the general solution (510) and further questions to ask the caller (520), a second section detailing exceptions to the solution (530), and a third section detailing contact numbers for further information (540). Solution information is stored by the system in a taxonomic tree or hierarchy, one embodiment of which is shown in FIG. 6, using the solution titles as general reference points (the trunk) around which more specific information is grouped (branches). This method of arrangement simplifies access by users, allowing them to locate more efficiently the information that they need.

Urgent Notices and Ensuring Information is Read and Understood

Figure 7A:
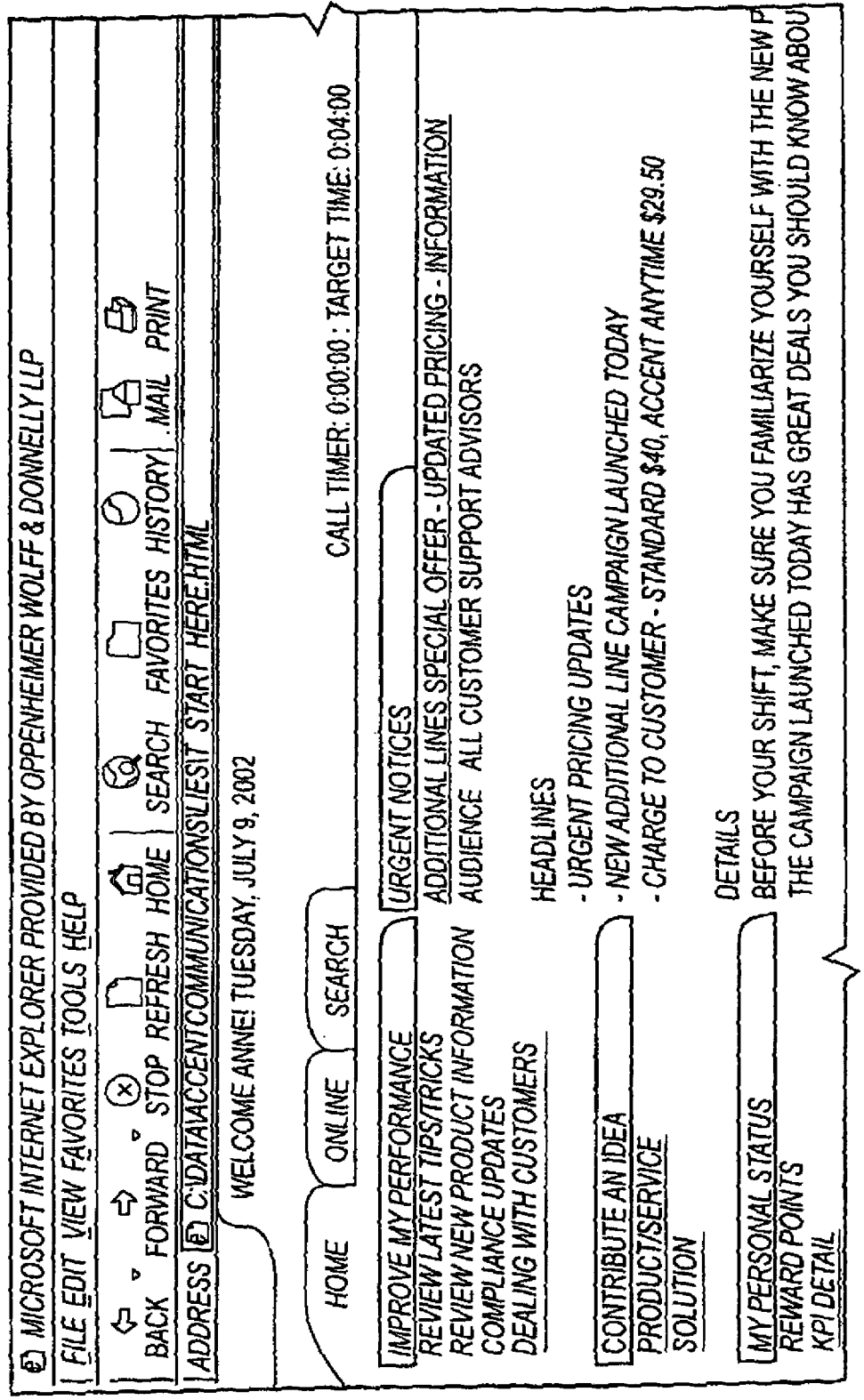
FIG. 7 is a screen shot of the Urgent Notices section of the Contact Center System.
Figure 7C:
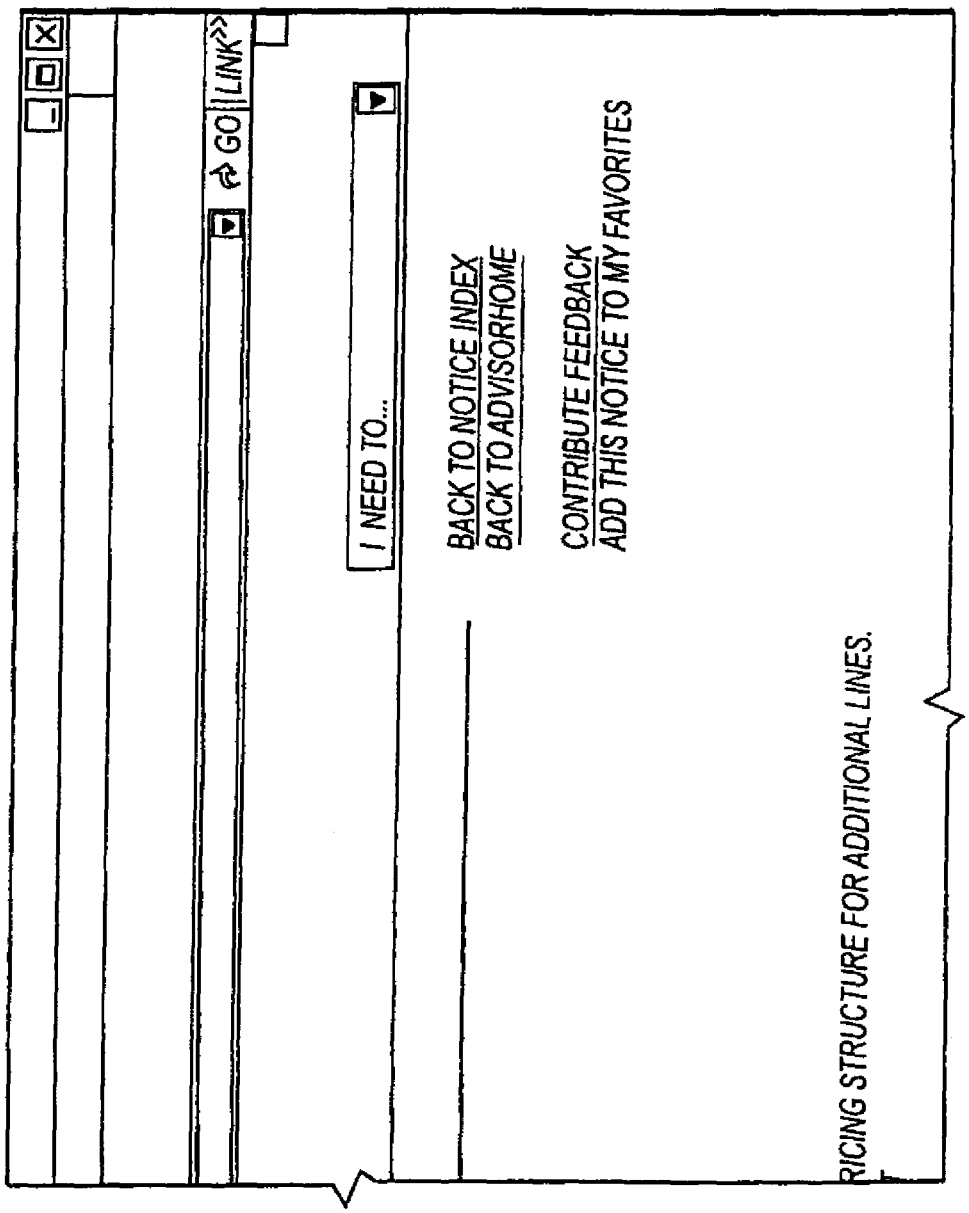
Figure 7D:
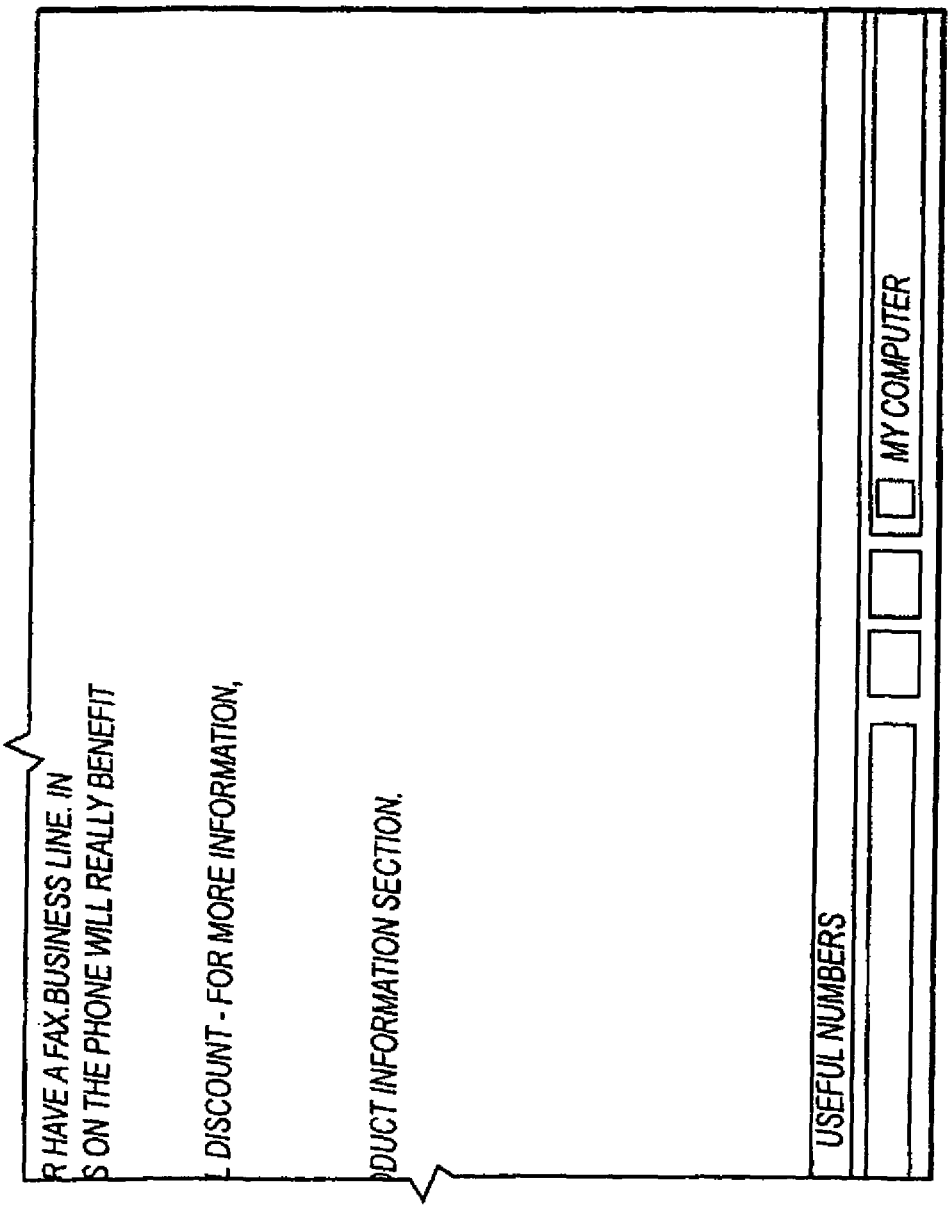

The urgent notices information box 205 provides links to web pages regarding the listed urgent notices (e.g. details 280) as determined by the user's role. Clicking on the link takes a user to the update notice, which provides information to multiple users regarding new information, updated information, or alerts (FIG. 7). Once the user has read and understood the material presented in the notice, he or she may be required to take a quiz on the subject. Quizzes may be conducted based on a random generator, based on the user themselves, based on the content provided, based on the time or date, or based on any group or groups to which the user belongs. In the webpage of FIG. 7, there is a link 710 that is clicked to go to the quiz. The link brings up another window, an embodiment of which is shown in FIG. 8, which presents a short quiz to the user. Once the user takes the quiz and clicks the submit button 805, the system will store that information. The quiz allows the system to capture the user's understanding of the information presented (such as new information, an alert, or an update to pre-existing information). The quiz results may be used by supervisors and others to improve a user's understanding of new information, to modify the method by which the information is disseminated, or to track what new knowledge users have acquired. Without the quiz function a manager or administrator cannot verify whether the material was read or understood. Depending on the user's quiz results, corrective information can be sent to the user to improve the user's understanding of the information.

More Industry Taxonomy

Figure 11:
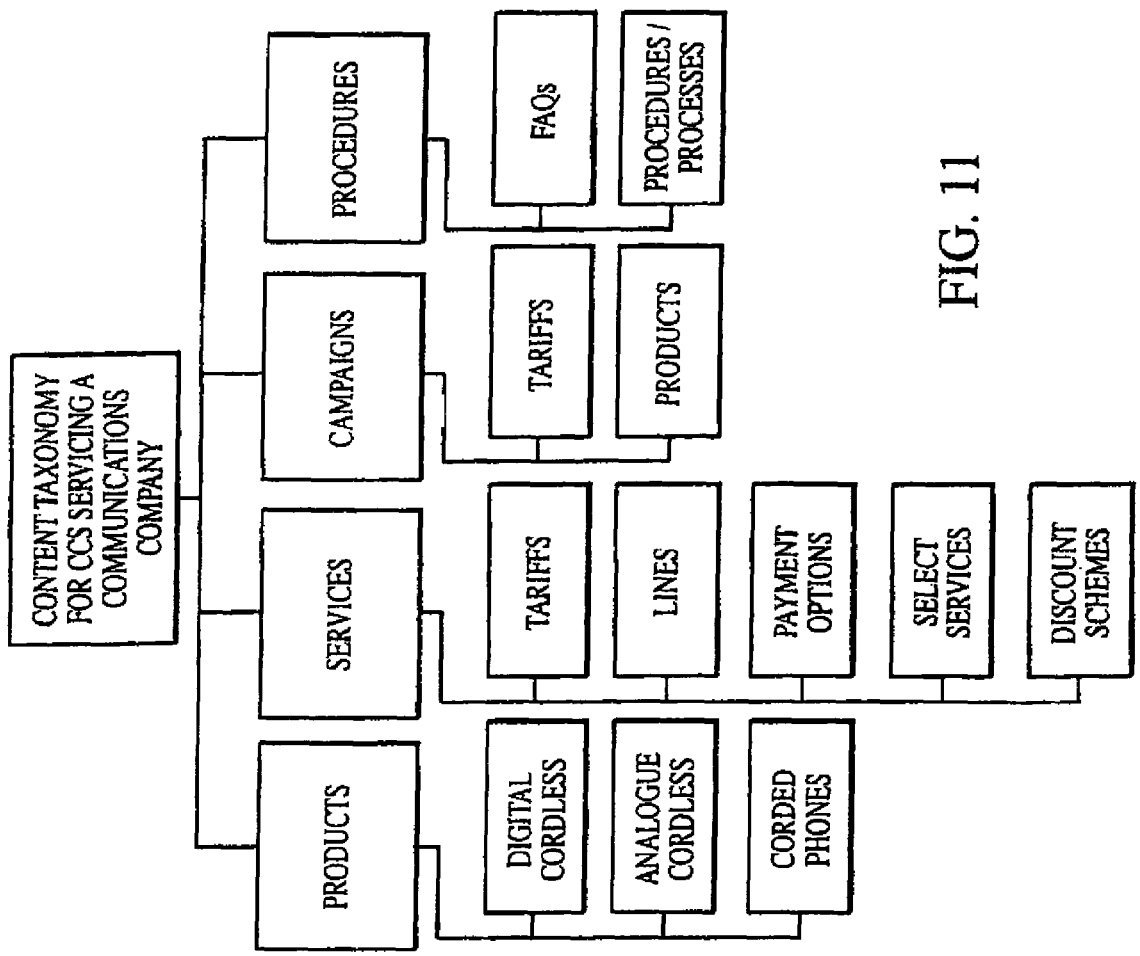
FIGS. 11 through 18 are block diagrams showing one hierarchical content taxonomy for the telecommunications industry.
Figure 12B:
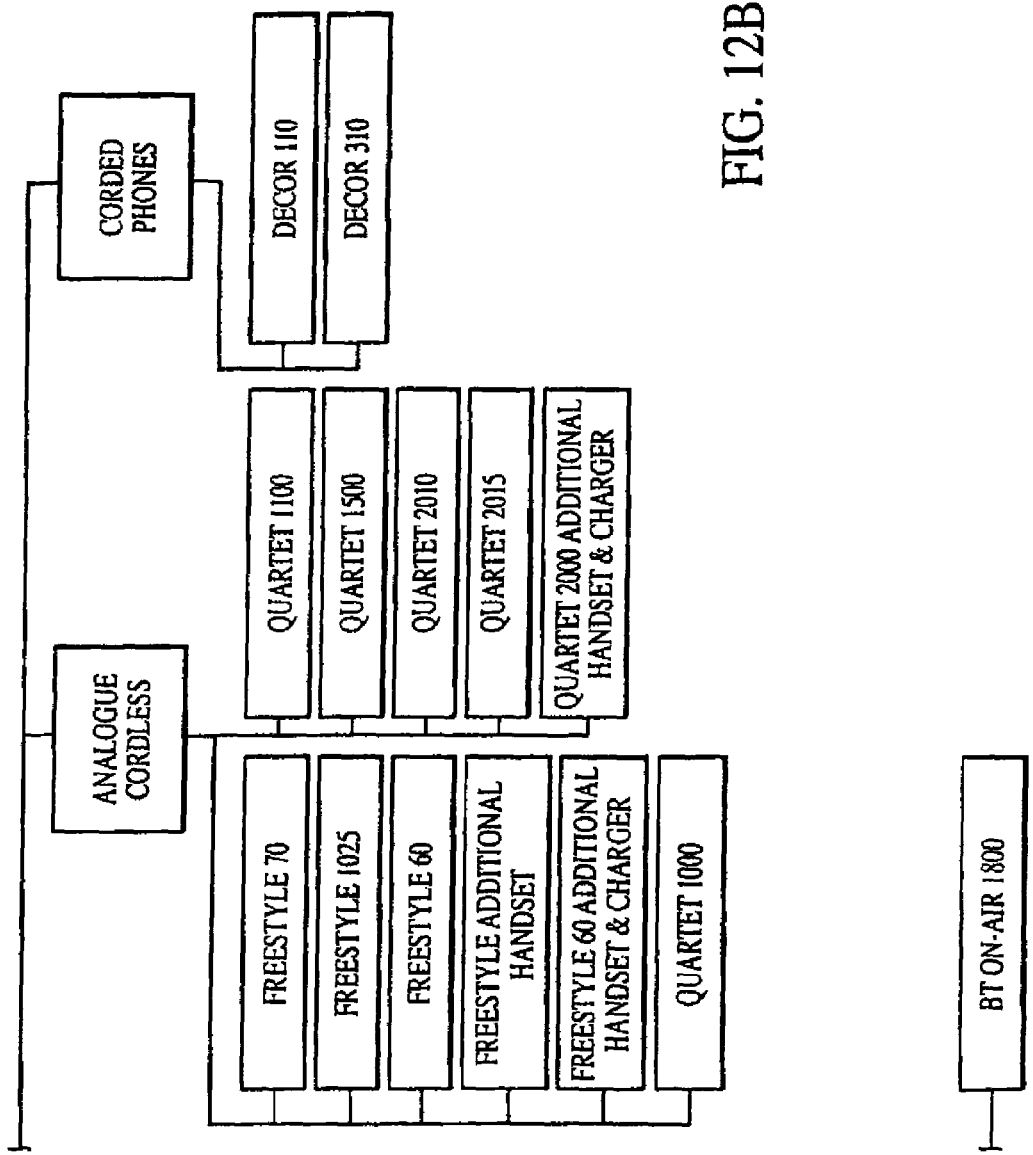
Figure 13:
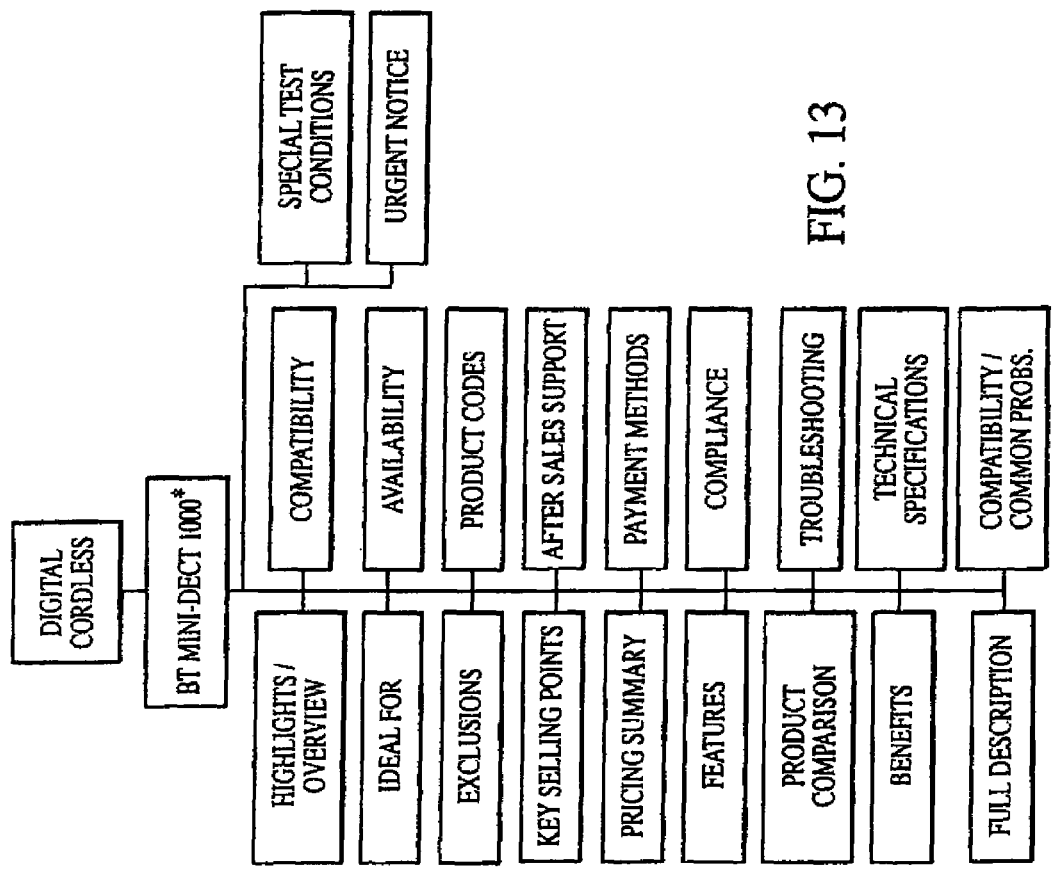
Figure 14:
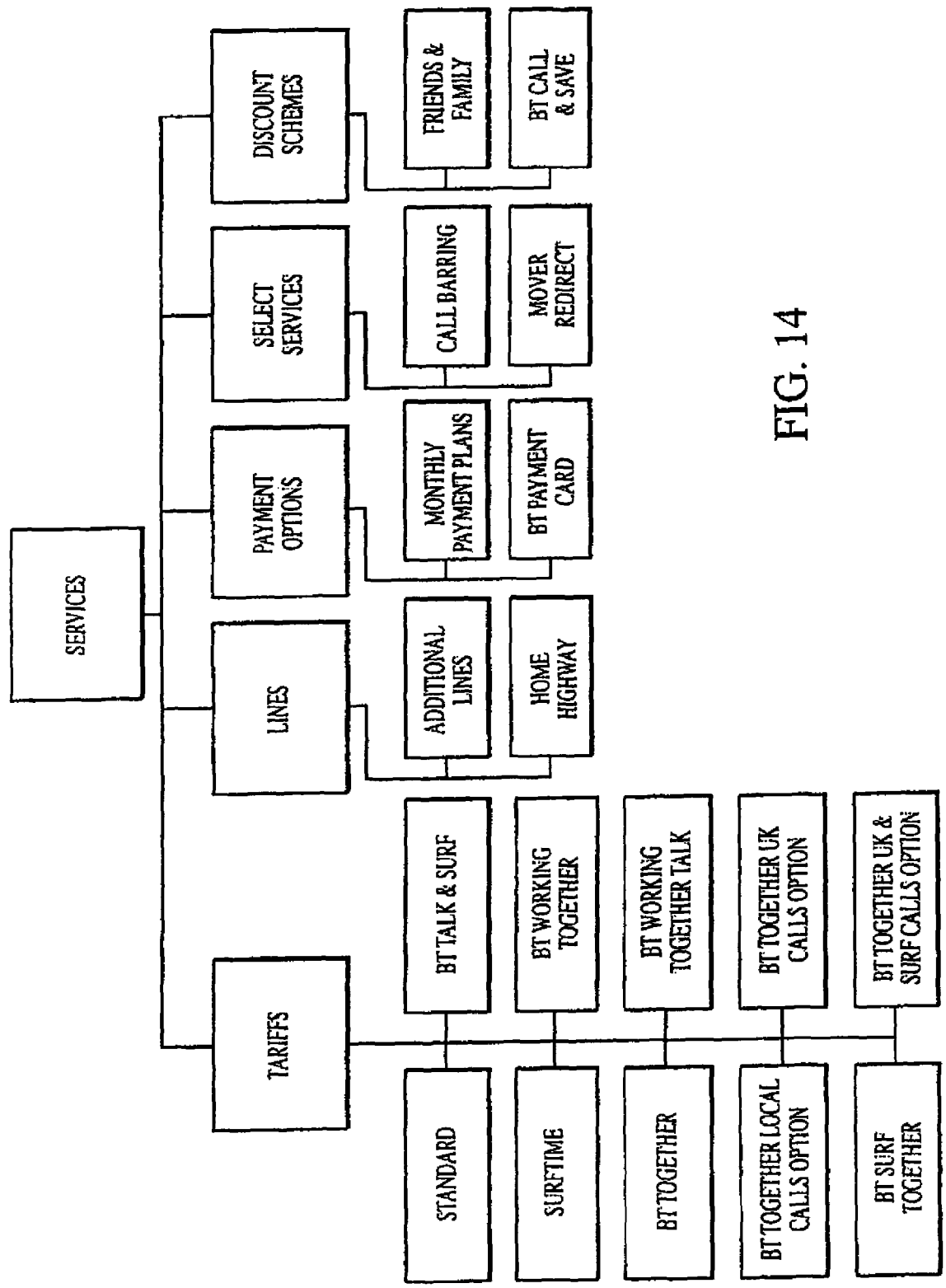
Figure 15:
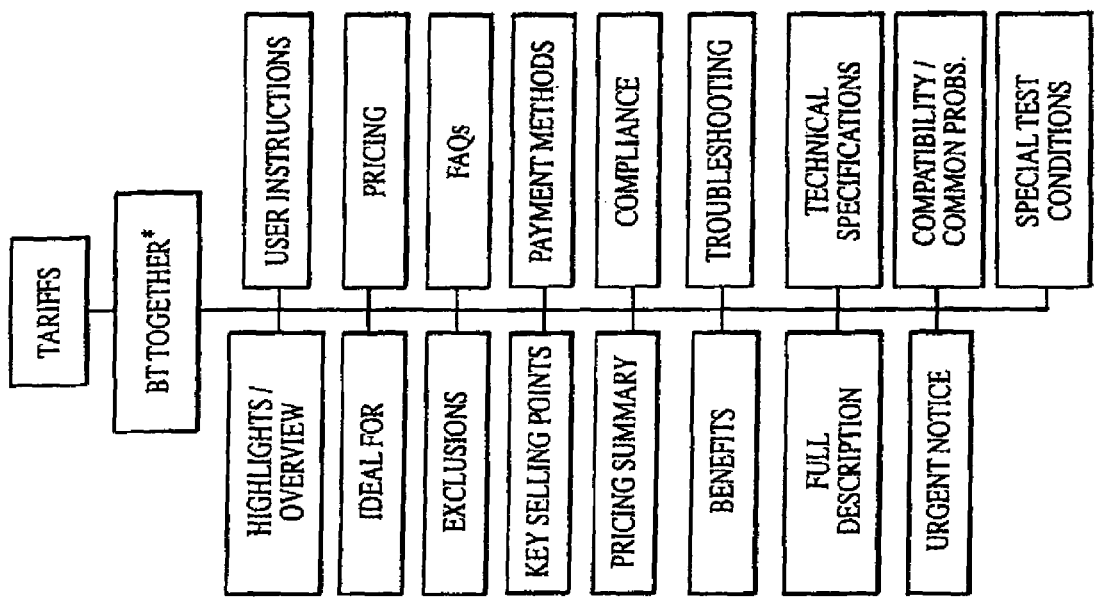
Figure 16:
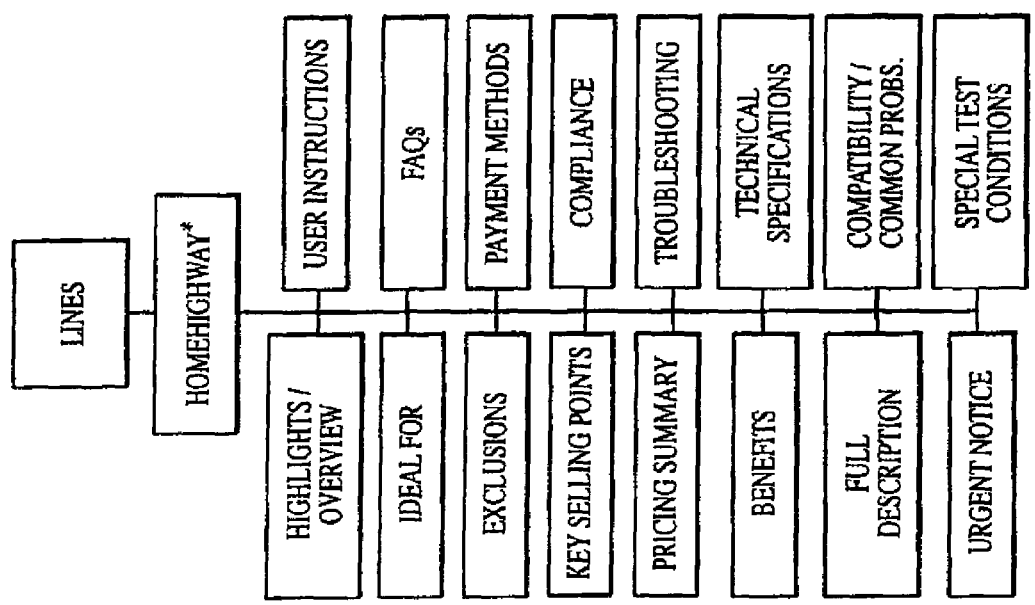
Figure 17:
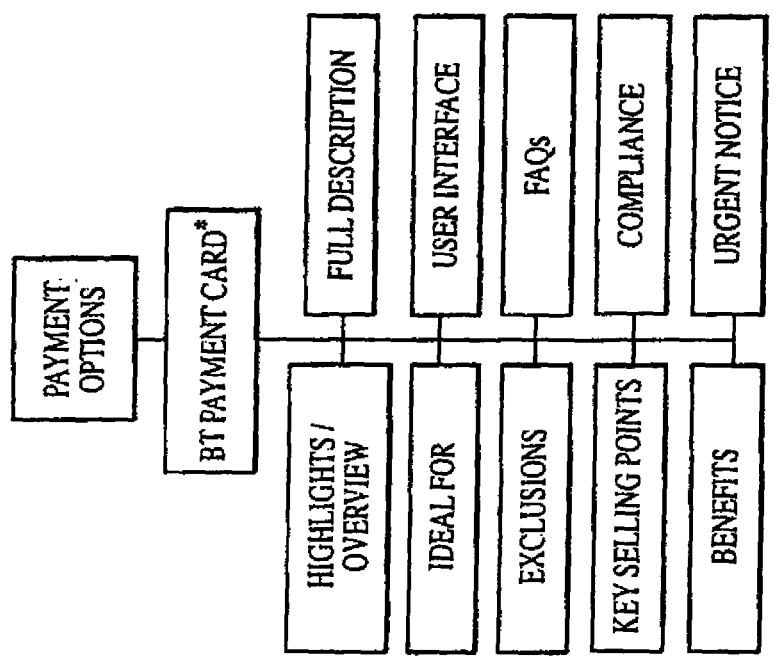
Figure 18:
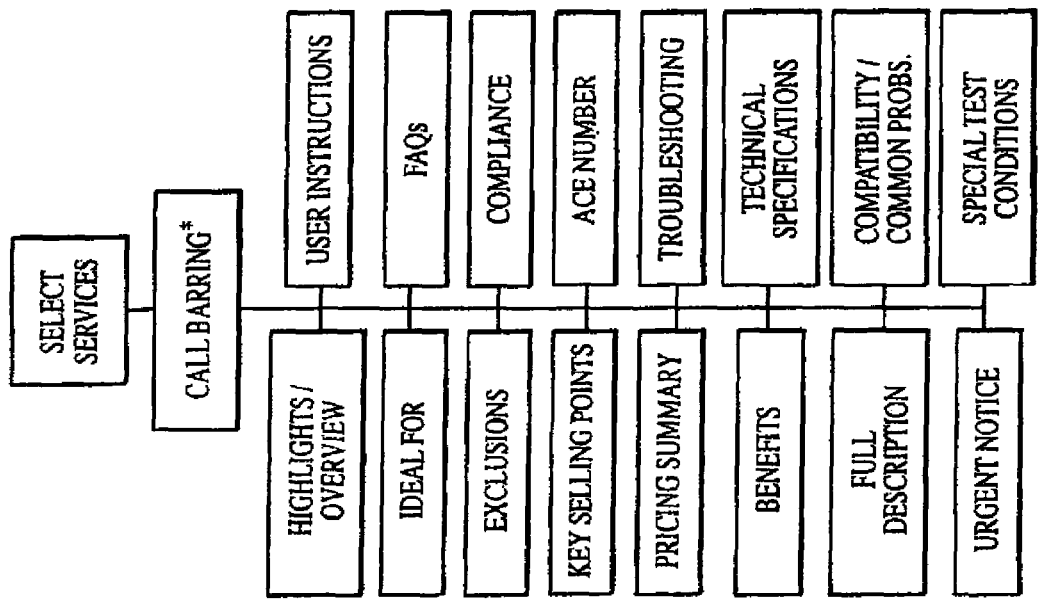

As discussed above, an intuitive taxonomy (or categorization) of reference material assists in easy retrieval of the desired information. FIGS. 11 through 19 illustrate one innovative arrangement of data for a CCS directed to a company in the telecommunications industry. As shown in FIG. 11, four primary categories into which all reference information is sorted can be: products, services, campaigns and procedures. FIGS. 12 and 13 show an example of hierarchical subcategories for a product. FIGS. 14 through 19 show examples of the subcategories for services. To use such a taxonomy in the CCS, a content management database is created having the hierarchical categories and subcategories related through the use of database tables, record fields and keys. For example, content about the features of the key selling points of the BT Mini-Dect 1000 digital cordless phone (see FIG. 13) can be stored in the database in the following fashion:

In addition to the primary categories shown in FIG. 11, user intentions (a.k.a. customer needs) can be another category implemented. This mechanism aggregates content associated with a specific customer or contact process. For example, "Moving Home" will require the disconnection of a service, cancellation of the bill, reconnection of the service, reestablishment of the bill to the new address. A 'One Click' solution to common and uncommon customer or contact processes has been developed to provide access to all content associated with a given processes.

A Continuum of Search Capabilities

As websites have become an everyday source of information, users have been frustrated with not being able to find the information quickly and easily. Search engines usually require a user to type in a phrase or key words. There are directories (such as the one provided by www.google.com) that attempt to place all of the information from the web into a neat set of categories. However, even these directories are not always useful. The problem is that each person will use a different approach to look up information. What is an obvious keyword to one person may be confusing to the next person. Also, some items that a user needs to look up information for may have clear terminology while others are less definite. To handle the problem of how to assist the user in searching for content, the CCS shown in the drawings offers not just a single search utility, but rather provides a continuum of search utilities. This allows the user to use the type of searching best suited to him or her, or to the type of information being sought. In addition, it allows the user to quickly move to another type of searching technique if one technique does not retrieve the desired results.

Figure 9:
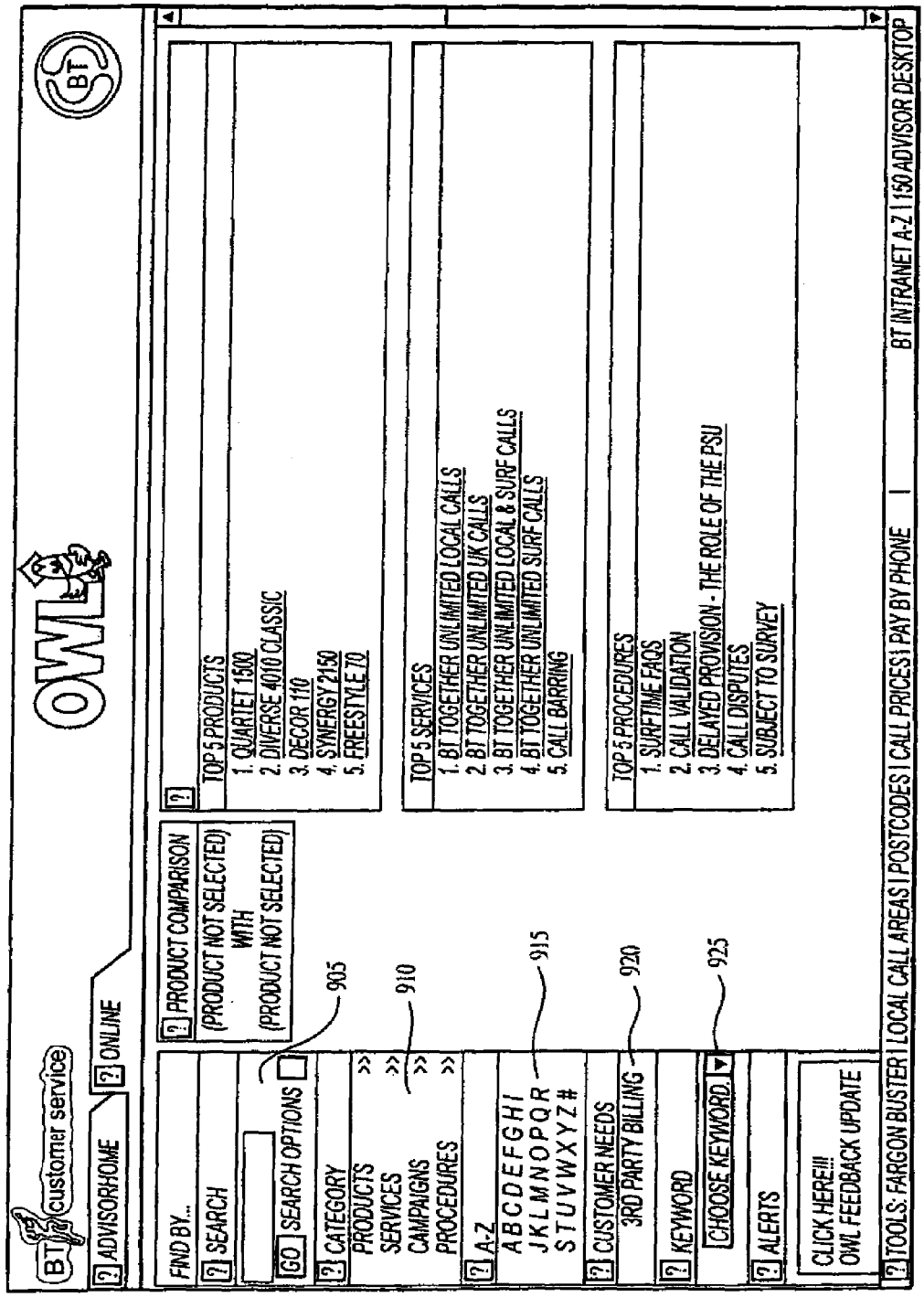
FIG. 9 is a screen shot illustrating the continuum of search functions offered.

FIG. 9 shows one search screen for a CCS. Note that the continuum of search facilities are provided on the left side of the display. In the example of FIG. 9, a representative can search by a keyword 905, via a hierarchical categorization 910, by an alphabetic index 915, by customer needs (a.k.a. customer intentions) 920, or by a drop down list of keywords 925.

Figure 10:
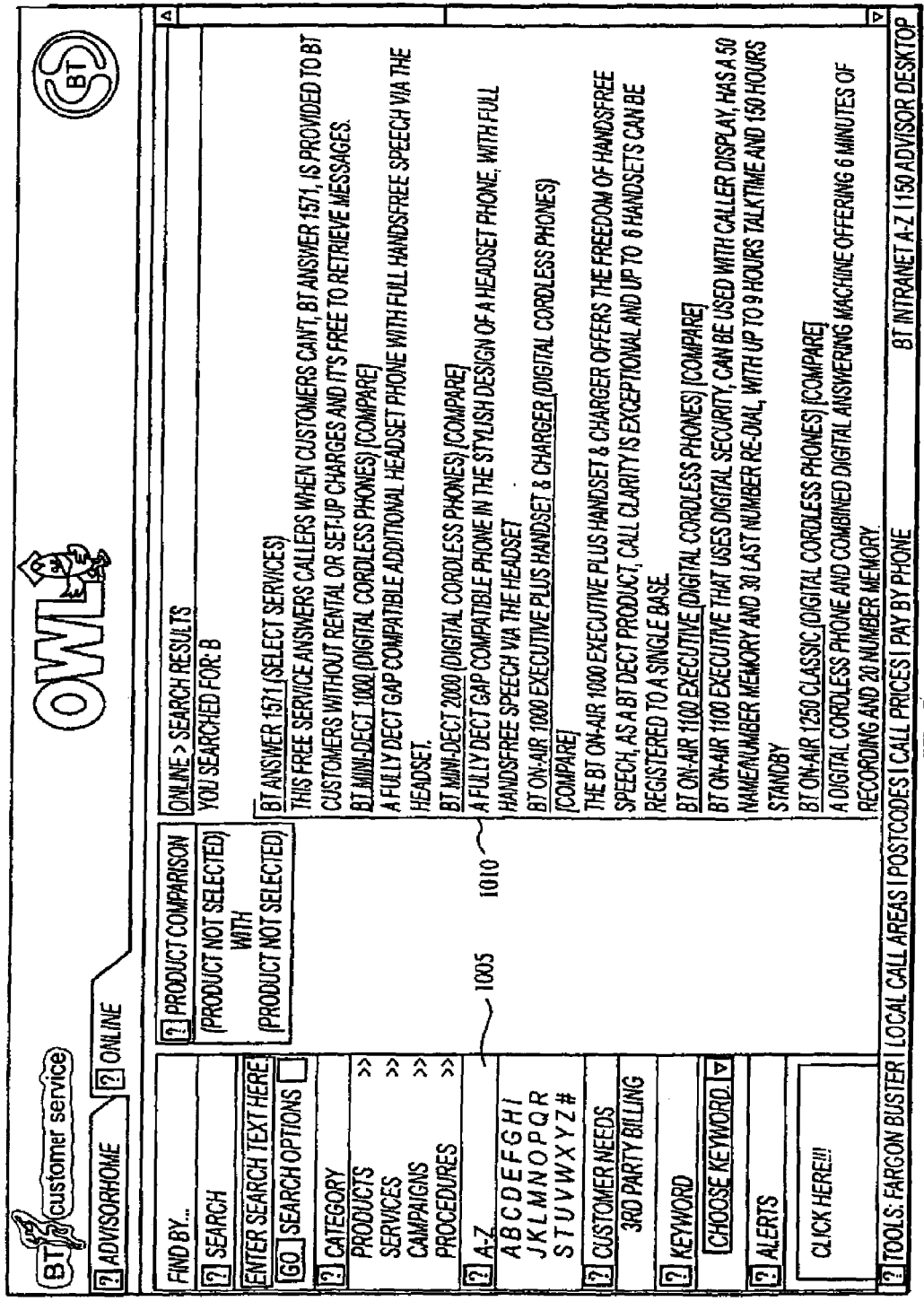
FIG. 10 is a screen shot showing the details of an alphabetic search.

FIG. 10 shows the result of a representative using the alphabetic index search 915 by clicking on the letter "B" 1005. The right side of the display shows the results from the search. Notice that all of the results are products that all begin with "BT." In this example, the alphabetic search is not the easiest method to use. As the figure shows, since the results appear in the right side of the display, all of the continuum of search functions remain available on the left side of the screen so the user can easily move on to another type of search.

Figure 19:
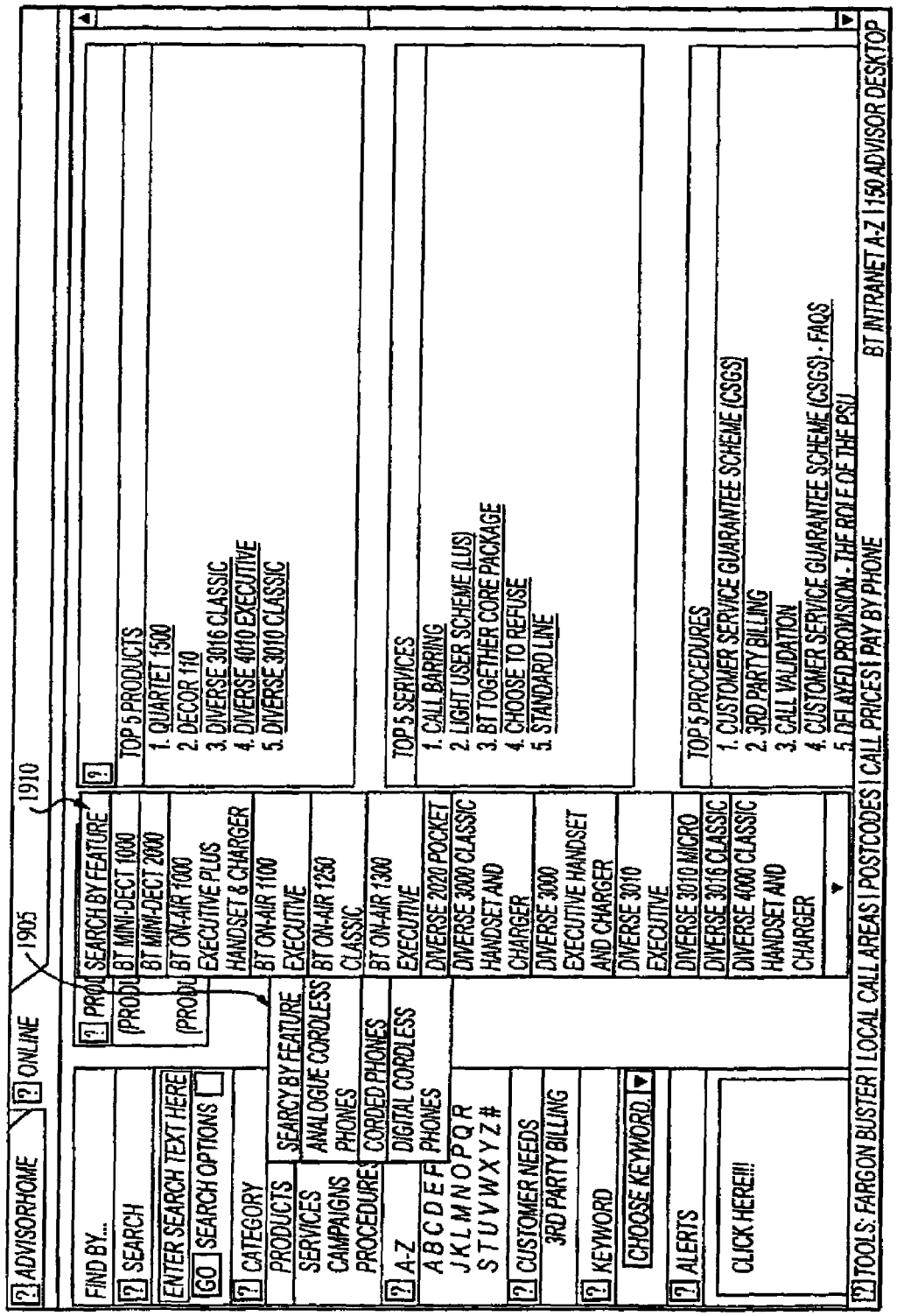

FIG. 19 shows a service representative in the middle of a categorization search 1910. By pausing the selection pointer over the "Products" label (or by clicking on it), the next level of hierarchy is presented 1905, which includes the categories of "search by feature," "analogue cordless phones," "corded phones," and "digital cordless phones." By then selecting "search by feature" further subcategories are presented 1910.

FIG. 20 shows the resulting webpage when the user continues the search by choosing the "search by feature" category. The user is prompted for the type of product 2005 and key features 2010. Based on these parameters, the search results are displayed to the user 2015. The user can choose to continue his or her research by comparing the chosen product against a second product 2020. FIG. 21 shows the results of such a comparison search.

Figure 22:
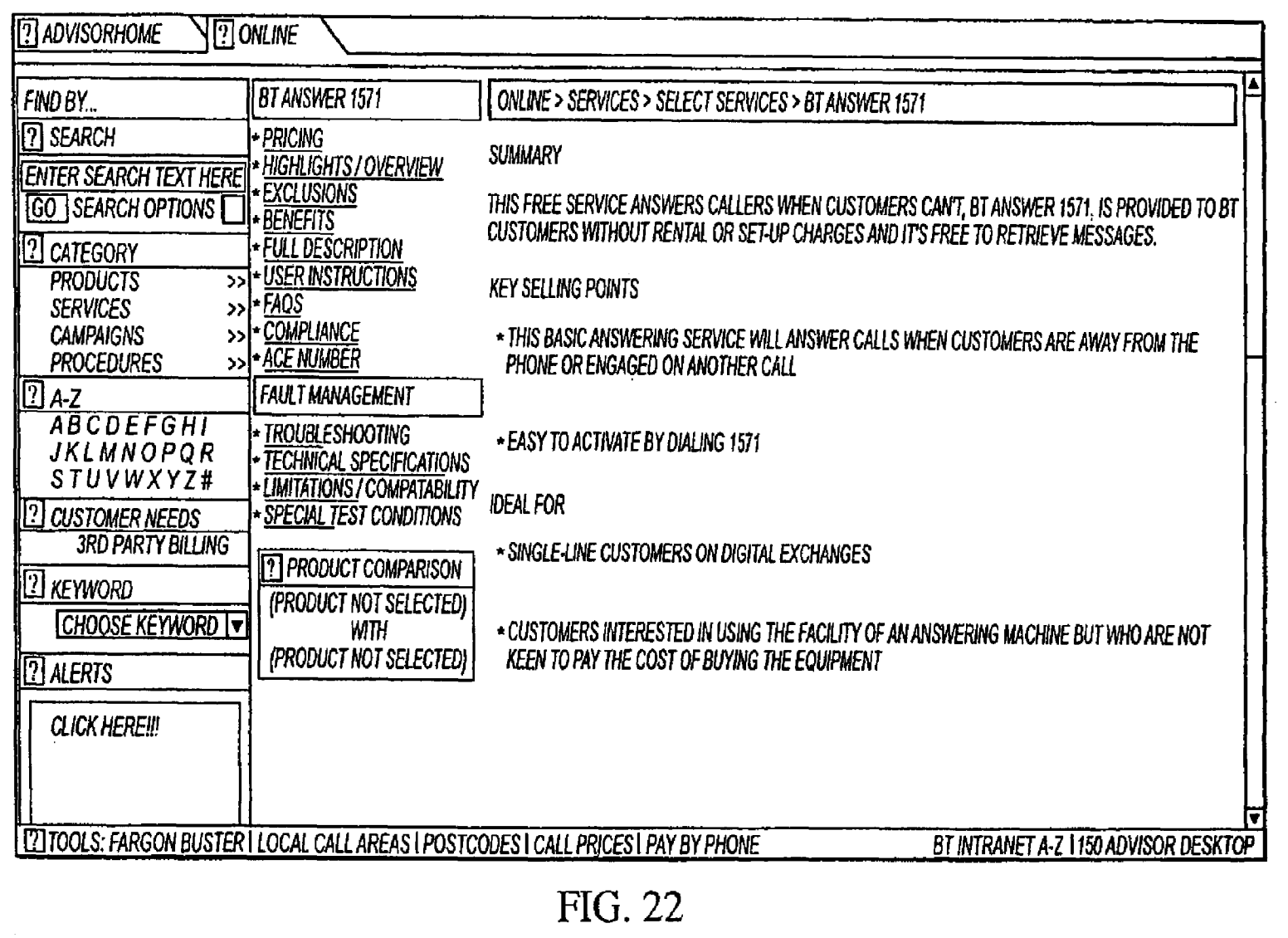
Figure 23:
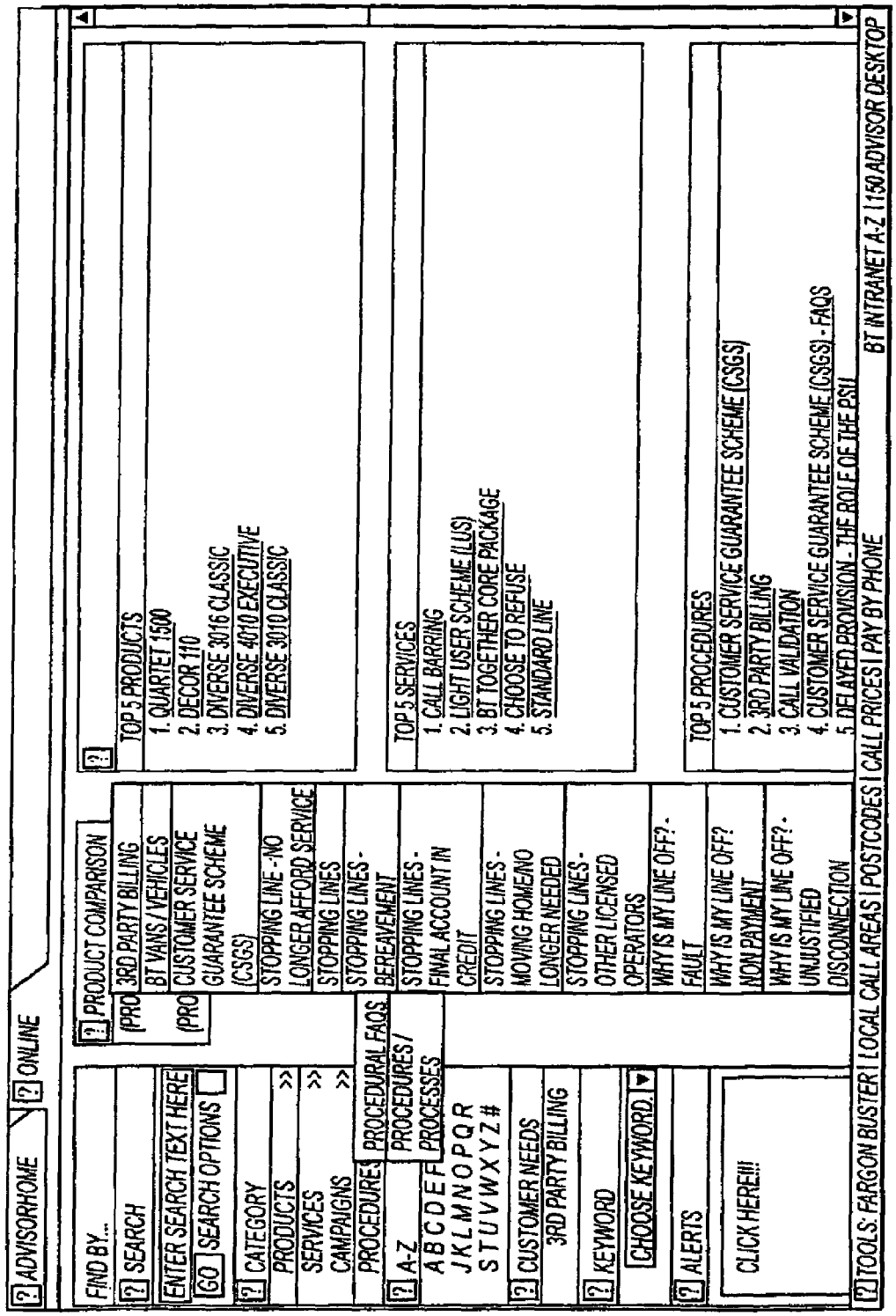
FIG. 23 is a screen shot showing the process of the Search by Category function.

The categorization search 1910 just demonstrated for products offers different result formats depending on the category. For example, FIG. 22 shows the results returned when the "services" category is chosen followed by the "select services" subcategory and then the "BT Answer 1571" subcategory. Here, the results are shown with a summary section, a section describing key selling points, and a third section with recommendations for ideal uses. Additional links for this service can be accessed in the second column of the screen (such as "pricing," "highlights/ overview," etc.) FIG. 23 shows some of the categories available under the "procedures" division.

Figure 24:
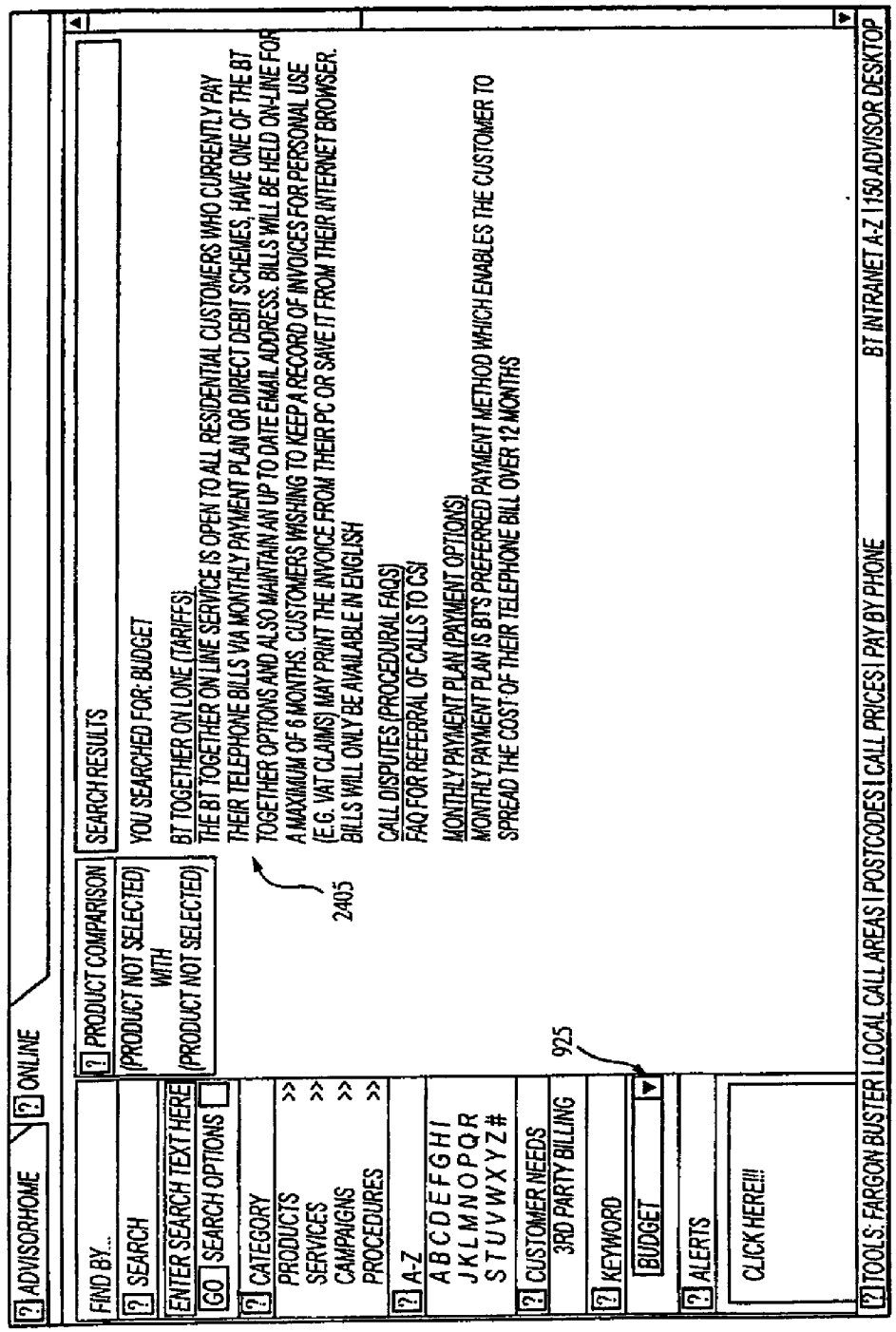
FIG. 24 is a screen shot showing the results of the Search by Keyword function.

FIG. 24 demonstrates the keyword searching utility 925. In that figure, the keyword "budget" has been chosen and the results 2405 are displayed on the right side of the screen.

Figure 25:
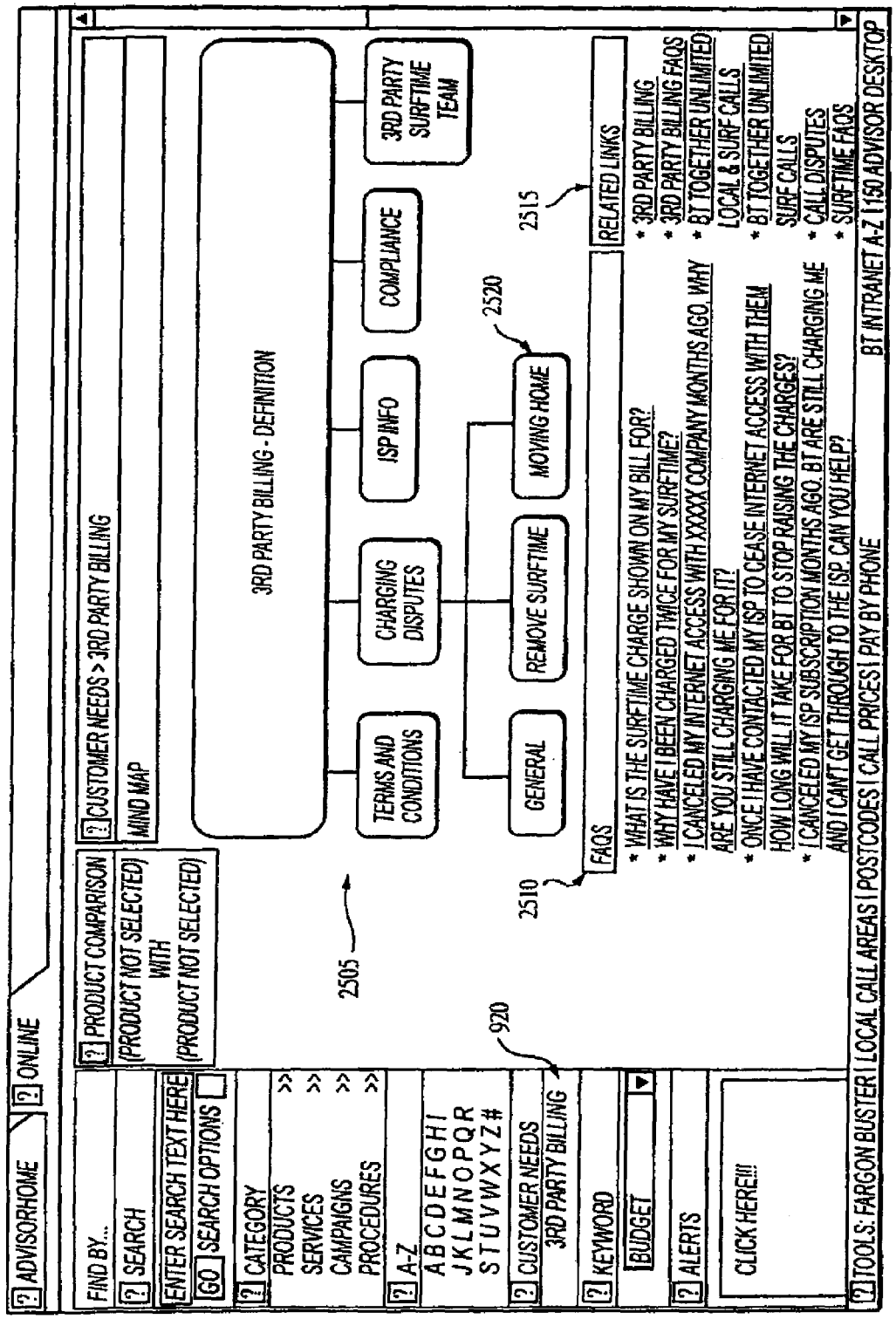
FIG. 25 is a screen shot showing the results of a Customer Needs search.

FIG. 25 demonstrates a powerful search utility—the "Search by Customer Needs" 920. There are some circumstances that a customer will present an issue that is not readily defined by a single keyword or category. Or, that issue might be associated with numerous other categories which would not normally be associated. For example, in the telecommunications industry, when a customer dies, a landlord may call the contact center to have the service disconnected. Or, the customer may have many questions about the concept of being billed for an ancillary phone service by a third party, such as Internet access by an ISP. While various representatives would look under different keywords or categories, these situations can be grouped by describing what the customer's current needs are or what the customer's intentions are. A single click on the proper customer need 920 displays a mind map of the relevant concepts, along with frequently asked questions 2510 and related links 2515. The user can then easily choose which concept best fits the situation, such as how the act of the customer moving home may result in a charging dispute 2520.

CRM Integration

Figures 26, 26A:
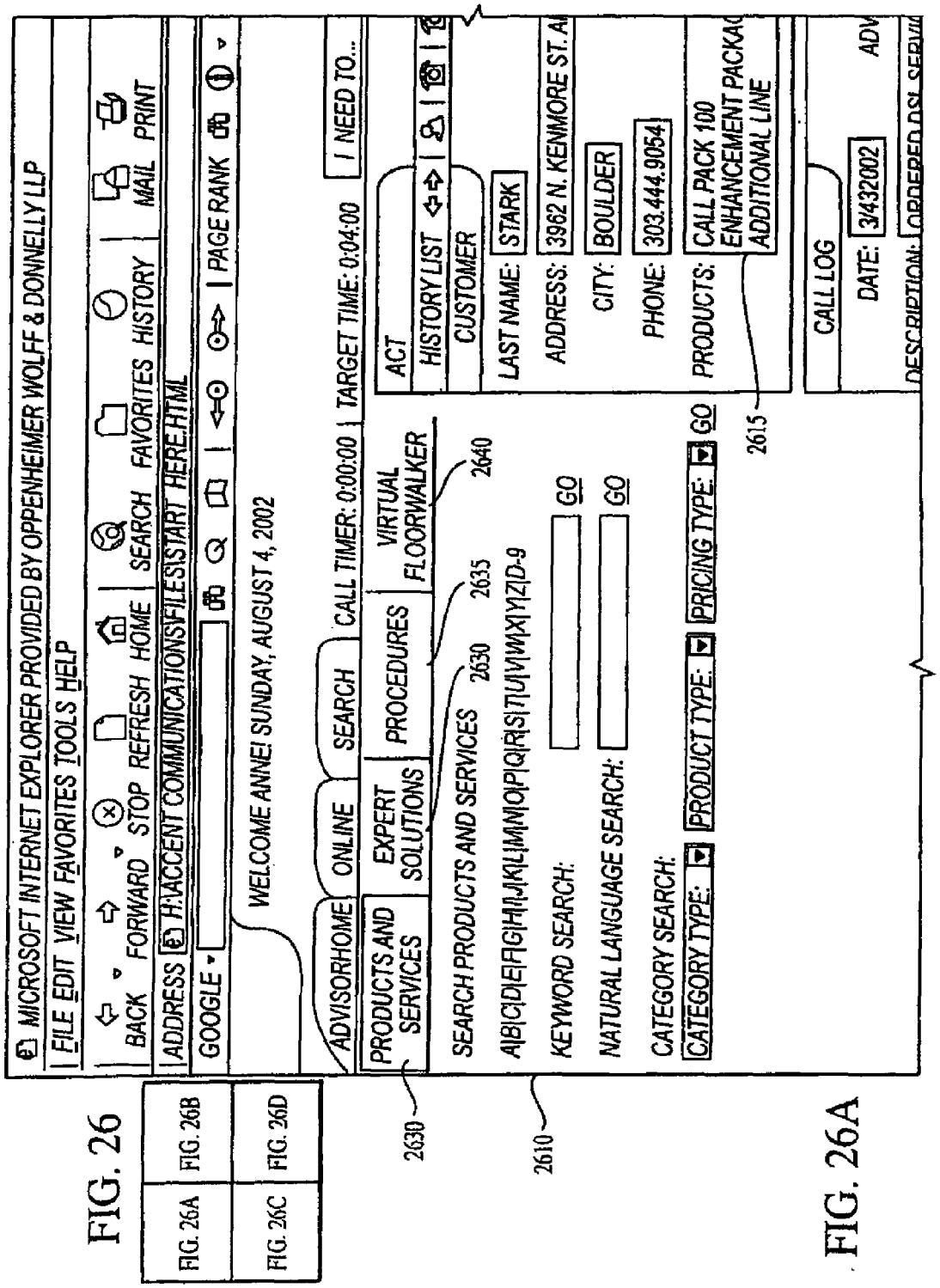
FIG. 26 is a screen shot showing the dual display of a CRM product next to various search functions.
Figure 26B:
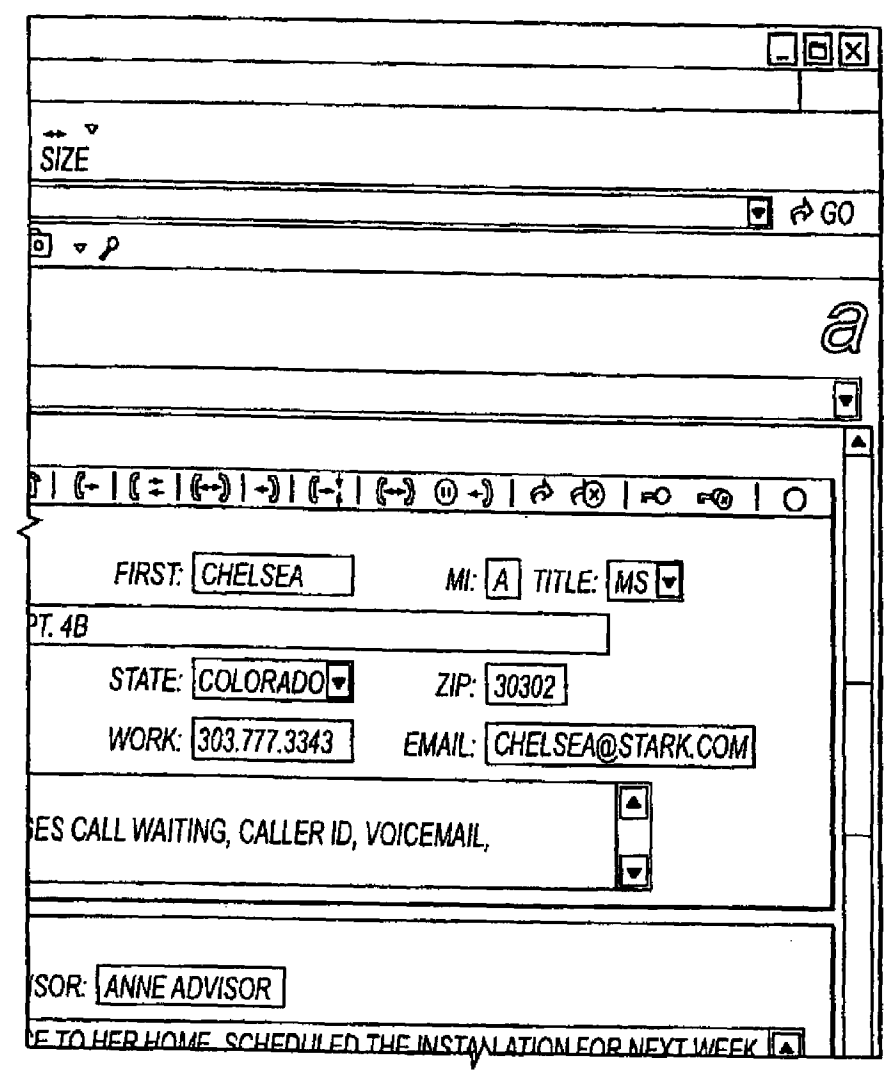
Figure 26C:
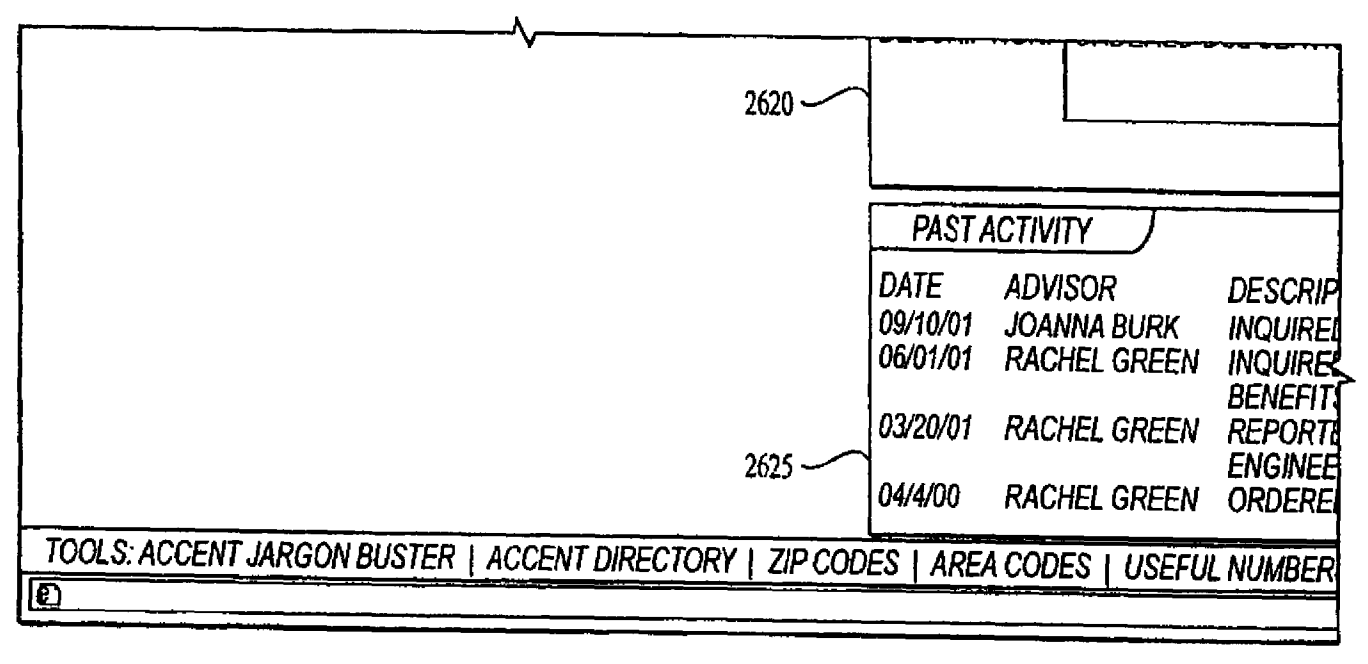
Figure 26D:
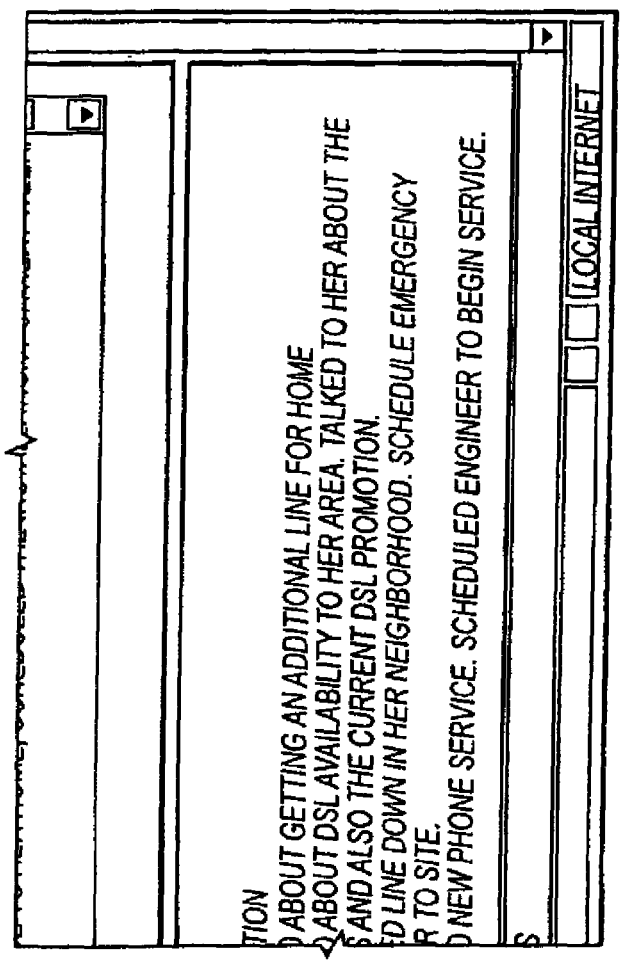

Of course, one of the primary purposes for a CCS is to assist with the representative's interaction with customers. A CRM product is used to capture, store, and retrieve customer information during the interaction. The present invention provides integration between the various functions and a CRM product. FIG. 26 shows one embodiment of the information displayed when the user clicks on the "online" tab. The screen is divided into various regions. In the FIG. 26 example, the two primary regions are the CRM contact center application on the right side 2605 and a reference utility on the left side 2610. While the present invention may integrate with any of a number of CRM contact center applications, for the example shown in FIG. 26, the CRM contact center application provides customer name, address, and similar information. It also informs the representative the products and services currently owned by the customer 2615. A call log 2620 allows the user to input details about the interaction for future reference. The history of calls are available for retrieval in the Past Activity region 2625.

The reference utility area 2610 can display one or more types of reference material. The example of FIG. 26 gives the user the ability to search for products/services 2630, lookup solutions to problems 2635 or find out about procedures 2640. The searches can be accomplished through a continuum of search utilities (as discussed above). For example, an alphabetic search, a keyword search, a natural language search and a category search are shown as examples of such a continuum.

This online display simultaneously provides the user with both the CRM access as well as the reference access. These two regions are dynamic and integrated, such that they are context appropriate to one another. For example, when the user is in the Products field 2615 of the CRM application, the Products/Services search can be automatically displayed in the reference region 2610. Later, when the user is in the call log region of the CRM application 2620 and is typing in the user's question or problem, the reference region 2610 can automatically search on the call log's description and display the most relevant expert solutions. This integration of the two areas of the CCS helps the user to respond to the customer more easily and more quickly. By prompting the user with context-appropriate data, a newer user can appear to the customer as a seasoned expert.

Content Management: Authoring and Publishing

While the contact representatives are the users of the system as they interact with clients, another group of users help to manage the content itself. The software used for publishing the content can be integrated within the CCS itself, or can be a stand alone application. Here, it will be referred to as the Content Management System ("CMS"). The CMS publishes (or loads) approved content to the CCS for viewing by the contact center representatives.

Content publishing and management is well known in the art. However, it is not without problems. The present invention CMS automates many of the problems in current content management systems. FIG. 27 shows one example of a software interface which is one of the first used in adding new content. Here, the user assigns the new content to a primary category within the previously described taxonomy (by choosing one of Product, Service, Procedure, or Jargon Buster Item) 2705. A title associated with the content item is entered 2710 and the author identified 2715. To enable the content item to be correctly retrieved by the continuum of search utilities, keywords, user intentions and the correct category are all entered (2720, 2725 and 2730).

Finally, the person who is charged with reviewing and approving the item is selected as well as the milestone dates—such as the commission date, write by date, publish by date, and expiry date (2735 through 2755). These dates are used as due dates for the various steps towards publishing the content item.

In prior systems, the author, manager or publisher, was required to manually choose the proper set of templates to be used in building a new content item. For example, if the user wished to generate content for a new product, a characteristics template, a selling points template, a key features templates, and a photo template may have all needed to be completed. If one or more of these templates were not generated, then either the item could be successfully published to the CCS, or the CCS user would be faced with missing data when the content item was retrieved. For example, the CCS user may be accustomed to seeing the key selling points whenever a product or service is searched. Unless that template was included in the creation of content for each new product, it would not always be displayed. This created confusion and missing information.

The present invention uses a data structure that determines the proper set of templates that are required based on the type of content to be added. For example, in FIG. 27, a product has been selected in the family filed 2705 and more specifically, that product has been declared to be a cordless analogue phone in the category field 2730. Based on this information, the CMS can choose the proper set of templates and present them to the appropriate users. In the example of FIG. 28, each template is presented via a generated task. Thus, when a user set up the system for a new service known as the "Home Highway" service, the following five templates were determined to be required: Overview/Highlights, Ideal for, Full description, Benefits and Recap. The author's task list has five tasks added (2805 through 2825), one for each template. The due dates 2830 are based on the milestones previously entered (2740 through 2755). The task lists (also known as a person's personal work stack) supplies the user with his or her tasks by deadline. By tracking the work accomplished on the assigned templates, the system can display a progress report, showing whether the content item is on track or is behind schedule.

While there is a defined set of templates to chose from, each type of content results in its own combination of required but independent templates. The system can be easily improved. For example, by upgrading any one template—such as the Benefits template—subsequent usage of that template by any of the template groupings that include the template, will use the updated version. Basing all content items on groupings of common templates has the further advantage that when a new type of content item is added, its template grouping can be based, in whole or in part, on the already existing common templates. This means that enhancing the CCS to include new content types can be an easier task.

Since the job of completing each template is based on a task generated for a user, multiple users can readily work as a team for each content item. For example, a specialist in marketing may be charged with completing the "Ideal for . . ." templates while a graphic artist may always work on the photo template. The defined workflow that determines how the templates are assigned can be changed by an administrator and then the subsequent content tasks are assigned appropriately.

In past systems, the original user was required to determine which templates were required and then would have to contact each of the team members and give them the various assignments. The present invention automates these tasks and thereby ensures that content items are properly generated, leveraging the previously described taxonomy of the content items to determine the proper list of required templates.

Past systems also were problematic at the point of publication. Once the templates had been commissioned and reviewed, the publisher had to ensure all pieces of the content from the various templates were completed, had been reviewed, and were approved. Manually, the publisher would check each content element before publishing the group to the CCS. The present invention automates this procedure and thereby ensures the completeness of every content item that is published. To do this, the system tracks each of the required templates for a content item. Each item can move from being commissioned, to being written, to being reviewed and then approved. Once the reviewer approves the format for a given template item, it is flagged for publication. Once each component of the content item is reviewed and approved, the entire group can be automatically forwarded to the publisher for publication. As long as any one of the required elements remains unapproved, the publisher cannot publish the content item. Of course, there are numerous variations that can be made for this automation. Some templates may be suggested but not required. The system can be enhanced to support such optional components for a content item. In such an enhanced version, as soon as all required components (but not optional components) have been approved, then the publisher is informed that the elements can be published.

To further ensure that all of the content components are published at the same time, the system assists the publisher with the act of publishing. Rather than requiring the publisher to select and instruct each individual component publication, a "one click" process allows the publisher to publish the entire group of elements using just a single command. A great benefit offered by this publication automation is that when new content types are added to the system, or when present content types have their groupings of templates changed, the publisher does not need to be retrained to understand and to remember the changes. Rather, the system automatically tracks which templates are required for a content item, assigns tasks to commission each element, tracks the progress of each element, and then signals the publisher when all required elements have been approved.

Technical Architecture for the CCS

Figure 29:
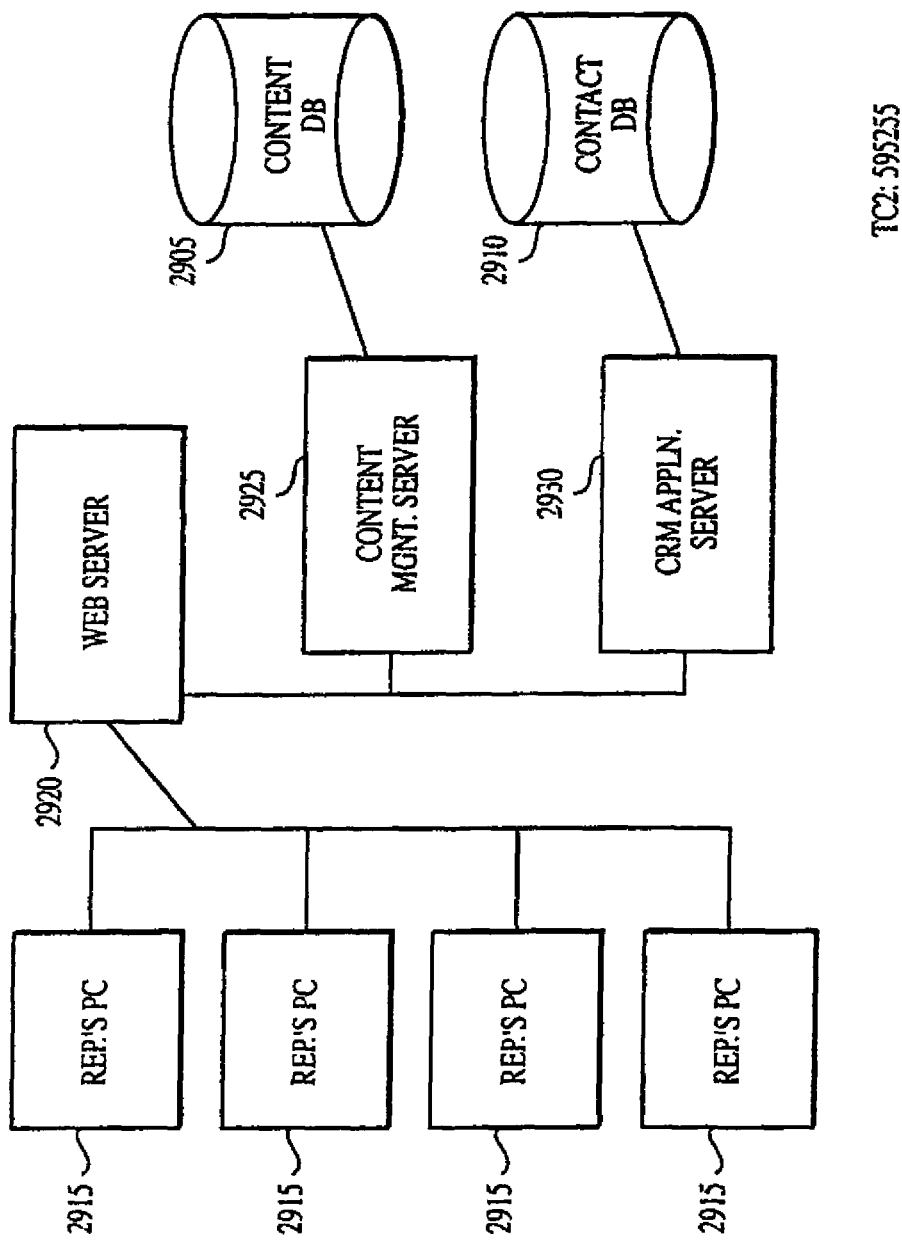
FIG. 29 is a block diagram of the technical components of one embodiment of the Contact Center System.

As one skilled in the art recognizes, there are many ways to install and operate a CCS/CMS. However, one preferred embodiment is illustrated in FIG. 29. In FIG. 29, the system consists of a series of PC's 2915 used by the representatives in the contact center. These are connected via a network (such as the Internet or an intranet) to a web server 2920. The web server 2920 receives requests from the PC's 2915, and serves the web pages to them. To support the integrated view through the CCS/CMS, the web server is integrated to various other servers, including a CRM application server 2930 (running a CRM application, such as SIEBEL CALL CENTER developed by Siebel Systems, PEOPLESOFT CRM offered by PeopleSoft Inc., or SAP CRM by SAP AG) and a content management server 2925 (running an application such as DOCUMENTUM 4I ENTERPRISE CONTENT MANAGEMENT PLATFORM by Documentum, Inc.). The servers access databases storing varying data, such as databases 2905 and 2910.

Technical Aspects for Testing Information Comprehension of Users

In one embodiment, the quiz functionality may be split into two components; templates to be seen by the end-users, and authoring functionality seen by people in the workflow for publishing new content.

The quiz as seen by end-users may consist of a web page form containing questions and radio buttons. It may be generated using ASP from quiz questions, correct answers, incorrect answers and feedback stored in the database. The quiz may be linked to specific content within a CCS/CMS, such as a new notice. After reading the article, the user may need to take the quiz, and their score may be recorded using active server pages communicating with a database. The quiz may contain information to provide correct answers and feedback so that the user can be corrected if they click on an incorrect answer. In this way, the user may be educated about the correct answer and the system may track where users are failing to understand content.

The authoring of the quizes may be done in an authoring environment. In such an environment, writers may use active server pages to build the quiz page without knowledge of HTML or other web programming. For example: if the author is writing a new article, they can add a link in this article that links to the named quiz about this article. This is stored in the database as an associated link in that article. In the database, links like this are held in the article links table. The authoring environment may enable the write to enter: questions, correct and incorrect answers, correct explanations, feedback, and links to further information within the CCS/CMS content.

The quiz and its associated questions and feedback may be stored in the database with a quiz ID. The quiz ID may be used to link to the quiz from anywhere in the CCS/CMS system. In this way, the user's answers can be linked to the quiz and ASP reports run to pull out and format the quiz results.

Once authored, the quiz can be reused at a future date by simply linking to the quiz ID stored in the database.

Technical Aspects for Capturing Insight of Superior Users

Technically capturing insights of good performers breaks down into two main areas—capturing their feedback and re-publishing the feedback as a solution. The feedback can be captured at any time by using web based forms where users can input content and feedback according to a predefined template. In one embodiment, the most appropriate point at which to capture feedback is when users are reviewing KPI data. The KPI data itself can be extracted from an external system. The link to the feedback forms may be programmed to only appear when the KPI is at an appropriate level. This may be controlled by a flag in the database which sets the "expert" level. ASP web pages may interrogate the database and if the KPI data exceeds this flag then the link may be displayed.

Clicking on the link may load the appropriate feedback capture form. This feature may be controlled by the feedback M. Once a feedback form is built, it may be allocated a feedback form ID in the database. Such an ID may then used in many other web pages to link to that appropriate feedback from.

When filled in, the form may collect information and store its fields in the database. The feedback/solution may then be reviewed by an editor who (if the solution is appropriate) can publish the solution. The solution is not automatically published on the website in one embodiment (even though this is an option) in order to allow rewording, reviewing and to ensure quality management. The articles generated may then go into the standard workflow for publishing.

Technical Aspects for Dynamically Ordering Solutions

In one embodiment of the invention, dynamically ordering solutions is controlled in two ways: (1) in response to usage figures which are stored in an Articles table in the database; or (2) manually by editors to "push" new content out to users. In the first solution, the CCS/CMS may take the number of hits a given content article receives. This usage figure can be used to automatically order a list of most popular articles, a Top 10 list, etc. The Top 10 page may search through the usage field in the articles, find the most used articles, and add the associated object to the Top 10 list page. The Top 10 list may be held in the database in the Objects table so a particular object can be associated with a Top 10 list.

In order to publish information quickly, an editor can set the Top 10 page to pick up a new piece of content which has just been published and which is considered important. In this way, the search through the usage field in the database may be stopped and instead, the Top 10 list may be manually edited using an ASP-based administration page. This may update the Top 10 field in the objects table in the database with new Top 10 information.

The Top 10 display page in one embodiment of the invention may be an ASP page that contacts the database and pulls out the Top 10 information held in the "top 10" field in the Objects table.

Technical Aspects for Dual Information System for Contact Center Users

As one skilled in the art recognizes, the structuring of online and offline content is a design issue. The feature may be implemented in the web pages in the design of the portal web site. During the design, each content item may be designated as an online element or an offline element so that each element is assigned to the appropriate region of the dual information system.

Technical Aspects of a Content Management System for the Telecommunications Industry The telecom taxonomy structure and headings have been previously discussed. This section shows how the taxonomy may be linked to and controls the way content may be added to a CCS/CMS. The basic structure of a CCS/CMS taxonomy can be explained with the following example:

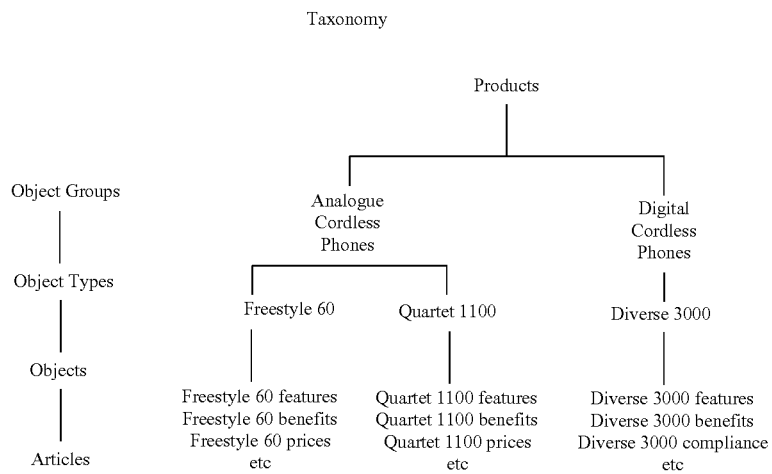

The lowest denominator for content may be an "article". Articles typically consist of text that may be formatted for impact (bulleted text, bold or italic text, or colored text) or direction (hyperlinks to other Internet or intranet sites) or pictures. All articles have a unique number or "article ID".

For example, in the above example, article 1149 contains text dealing with the key features of the Freestyle 60 analogue cordless phone. Article 1149 is one of several articles on the Freestyle 60 phone (others cover subjects such as highlights of the phone, the phone's price, and the phone's availability). All of these articles belong to an object called Freestyle 60 which in this case is a phone. The number of articles (or features describing an object) and their type is defined in the taxonomy.

Freestyle 60 is one of several similar objects that describe analogue cordless phones. I.e., there are other similar objects in this case other analogue cordless phones. In order that all these analogue cordless phones can easily be located and compared, they are grouped together under an "object type". In this case, the "object type" is called Analogue Cordless Phones. Many other object types can be defined. For example: Corded Phones, digital cordless phones or digital mobile phones may all be defined.

All object types (e.g. Analogue Cordless Phones, Digital Cordless Phones and Corded Phone) may belong to a common "object group"—which in this example is Products. Many other object groups can be defined, including services or procedures. For example, the object group of Services may group together and help define the characteristics of several object types such as discount schemes, payment options, tariffs etc.

In the database, the taxonomy may be implemented as a set of tables: OBJECT_GROUPS, OBJECT_TYPES, OBJECTS and ARTICLES. As explained above, these tables hold the generic groupings for the taxonomy. When an object (such as a model of phone) is created, it is created within an object group (e.g. products) and an object type (e.g. analogue cordless phones). In the database, this structure may be implemented using a datafield Object_type in the Objects table. This links to the Objects_type table which in turn may link to the Object_Groups table. Thus, the place of a specific object within the taxonomy is tracked.

One skilled in the art therefore understands that when a new object is created, the taxonomy automatically creates all the associated articles required to fully describe that object.

For example, if a new analogue cordless phone is created a CCS/CMS automatically creates a set of empty articles to completely describe this phone. These are then filled in by a writer.

Technical Aspects for Content Feedback in a Multiple-Owner Content Management

Using web-based forms generated from the database the system can capture a wide variety of feedback. This includes (but is not limited to):

(1) Feedback on content—such as accuracy, additions to content, amendments;

(2) Feedback on user generated solutions ways in which users have managed to obtain high KPI's, local tricks and tips, user insights; and (3) Feedback on use—where content has been particularly helpful or unhelpful, general ideas about new content.

From technical point of view, all these feedback types are very similar. The feedback form may be authored and may have a feedback form ID stored in the database. This ID can then be used to link to an appropriate feedback form at any point in the system. When a user fills in a feedback form, the information may be recorded in the database so that a member of the authoring process can review the feedback items using ASP-based reports.

Depending upon the type of feedback, the editor may wish to respond directly to the user or may use the authoring environment to publish a new piece of content. This can be done in response to request for new content or in response to new content in the form of a user solution. These contact items then enter the publishing workflow just like any other new piece of content. The technical components to enable this functionality may use ASP-based forms and web pages which are generated from a database.

Technical Aspects for Communicating Solution Information in a Knowledge Management System In at least one embodiment, the expert solutions taxonomy is technically implemented in the same way as the telecom taxonomy. This is detailed in the above section. In a similar manner to the telecom taxonomy, the expert solutions taxonomy may define a structure for the expert solutions to categorize them and to allow users to quickly and easily find expert solutions.

In the expert solutions taxonomy, the database may use generic tables for holding the taxonomy structure. These may be, for example, object_groups, object_types, objects and articles. In this way, the expert solutions taxonomy can be seen as a subset of the telecom taxonomy from a technical viewpoint.

The expert solutions may be authored in same way as other content. An expert solutions object may be created, such as "Customer can smell natural gas," for example. The articles generated by the creation of this object may then be written, approved and published in the same manner as for other content. The articles may be generated by the taxonomy as detailed in the above database tables.

Technical Aspects for Presenting Linked Information in a CRM System

As shown in FIG. 26, the system can be integrated with CRM applications. Since many CRM applications now have web-based user interfaces (such as Siebel 7) this integration can be completed using protocols (such as HTML and XML) that allow the system to integrate with many differing CRM applications. The knowledge management (KM) system can be set to display information relevant to the task currently being performed in the CRM application.

In one embodiment, each screen in the CRM application is allocated an ID and tasks which are associated with each screen are also associated with the ID. This context information (or tokens) can be passed to the knowledge management system in order for it to understand which content to show which is linked to the task currently being undertaken.

The tokens can take several forms, from URL's and hyperlink to keywords or task ID's. The URL's can be added to the CRM system. These will link directly to the specific content in the KM system and are used to pull up relevant information when a particular CRM screen is used. A more flexible method is to pass a token based on a task ID or keyword. The token may then be compared in the KM database with associated content objects. Each token (such as a keyword) can be associated with multiple objects thus allowing a richer display of content for each CRM screen.

In one embodiment of the invention, tokens (such as keywords) are been implemented in a CCS/CMS database and can be found in the keywords table. These are linked to objects using the object ID and so can be used to display content information which is associated with the keywords. The database can easily be updated using the authoring environment to link the keywords to different content objects or to create new keywords thus giving additional flexibility to the system.

Such a method can be used to link not just to CRM but to many other types of systems. In one embodiment of the invention, a CCS/CMS system is linked to a voice recognition (VR) system using this technique. The VR system can recognize words that cause it to send of requests for keywords to the CCS/CMS system. The CCS/CMS then displays information based on the keywords requested.

Technical Aspects for Enforcing Template Completion when Publishing to a Content In one embodiment of the invention, a web page built using ASP is used to commission a new object, such as a phone or a discount scheme. This creates a new entry into the Object table in the database. When an object is created, the taxonomy in the database describes the number and type of articles that need to be created in order to describe this type of object. For example, an object such as an analogue cordless phone requires 12 articles to fully describe this object. These articles include a highlights/overview article, an Exclusions article and a Benefits article. These types of articles have templates associated with them which force the writer to include the correct type of information when inputting the content. Other types of articles (for example a compliance article) have a different template associated with them requiring different information to be input.

In the database, when an object is created in the Object table it may fire a trigger to generate entries in the Articles table, one for each required article. As can be seen in the database diagram of Figure XYZ, each object is identified by a number (Object ID) and this links to the articles (article ID) via the Links table.

A Task ID may also be created in the Tasks table. This ID links to each article and is set so that each article is set to require a writer to enter content for the article. This controls the workflow of the article and will make the article appear in the task list of a writer. In this way, all the required articles to describe an object are created without the need for this to be remembered by those creating the content.

Technical Aspects for Ensuring Completeness when Publishing to a Content Management System This section describes how one embodiment of a CCS/CMS assists publishing by forcing all articles (which describe a particular object) to be written and reviewed before the object (such as a phone) is allowed to be published. This prevents publishing of incomplete or un-reviewed information.

Each object (such as a digital cordless phone) has a defined set of associated articles to describe it. In the database, the Object is linked to the Articles via the Links table. Thus, using the Object_ID one can find the associated articles. In order to ensure articles are only published when they have been commissioned, written, and reviewed, each article has an associated Task ID held in the Tasks table. As the articles are written and reviewed, the task status is updated. Only when a complete set of articles associated with a particular object ID have the correct task status (i.e. approved) will the object be available for publishing to the live environment. Web pages developed using ASP may be used to interact with the database in order to update the status of the articles and so control assisted publishing.

Technical Aspects for Searching within a Contact Center Portal

In one embodiment of the invention, the continuum of search functions allows users to search by: a hierarchical categorization based on the content taxonomy; an alphanumeric index; customer needs; pre-defined key words; and free text search. While some of the technical aspects of each of the separate searches have been implemented in prior systems, in the present invention, users may use a preferred (or most appropriate) search mechanism for their needs, while allowing for a wider and wider search of information if the initial search does not result in the proper information. The searches themselves are implemented as follows (in one of the embodiments):

(A) The hierarchical categorization search may be generated from the content taxonomy which is stored in the database in the object_groups, object_types and objects tables as explained in the technical aspects of the telecom taxonomy section. ASP pages may take this structure and the objects contained within it and display them as series of fly out menus. Users can click on the menus to select a particular object such as a phone.

(B) The alphabetic index searches on the first letter of the title of an object (e.g. searching on F produces Freestyle 60 and Friends and Family). These returned objects are listed as hyperlinks which link to the Object id. Clicking on the link causes an ASP page to interrogate the database for the articles associated with the object and display them.

(C) The Customer Needs search can allow users to quickly find objects linked to a particular need or life event of a customer. For example, a landlord may have a complex request when a tenant moves out which involves several procedures, services and products. The Customer Needs search groups these objects together.

(D) The pre-defined key words are added to the system as part of the authoring process. When a new piece of work is commissioned, the supplier adds keywords that the supplier thinks will be required to quickly search for this content. The supplier can also link to existing key words. For example, the "Call Barring" keyword brings back service objects which include the call barring service and procedure objects to do with switching this service on or off.

Keywords can be linked to objects using the Keywords table in the database. Clicking on a keyword causes the system to search for the Object ID associated with the keywords and return links to these objects. Clicking on the links causes the full object and associated articles to be displayed.

(E) The free text search can be enabled using Microsoft Index server but will work with any search engine. The index server searches on the text held in files that have been specially generated by the database. These files can be of any format, including htm, xml, asp or text. The generated files can contain text describing the object as entered during the authoring process and the object id associated with the content. The search engine can return a page listing the objects which contain the searched for text. Clicking on the link shows the lull object and associated content articles.

The foregoing description addresses embodiments encompassing the principles of the present invention. The embodiments may be changed, modified and/or implemented using various types of arrangements. Those skilled in the art will readily recognize various modifications and changes that may be made to the invention without strictly following the exemplary embodiments and applications illustrated and described herein, and without departing from the scope of the invention, which is set forth in the following claims.

What is claimed is:

1. A method, performed by a processor, comprising:
providing, by the processor and for display, a first performance indicator measurement of a first user using a web-based contact system;
comparing, by the processor, the first performance indicator measurement of the first user to a particular threshold;
determining, by the processor, that the first performance indicator measurement of the first user satisfies the particular threshold based on comparing the first performance indicator measurement of the first user to the particular threshold;
prompting, by the processor and based on determining that the first performance indicator measurement satisfies the particular threshold, the first user to submit feedback regarding how the first user achieves a performance level, while using the web-based contact system, corresponding to the first performance indicator measurement;
receiving, by the processor, the feedback submitted by the first user based on prompting the first user to submit the feedback;
storing, by the processor, information regarding the feedback;
determining, by the processor, a second performance indicator measurement of a second user using the web-based contact system based on activity of the second user while the second user is online;
determining, by the processor, that the second user has gone offline after being online;
determining, by the processor, that the second performance indicator measurement of the second user does not satisfy the particular threshold;
identifying, by the processor and when the second user is offline, a selection of a tab of the web-based contact system;
identifying, by the processor, training content related to using the web-based contact system based on the information regarding the feedback, based on determining that the second user has gone offline after being online, based on the selection of the tab, and based on determining that the second performance indicator measurement of the second user does not satisfy the particular threshold; and
providing, by the processor, the training content related to using the web-based contact system.

2. The method of claim 1, where providing the training content related to using the web-based contact system comprises:
providing, for display and in a browser program, the training content related to using the web-based contact system.

3. The method of claim 1, where the first performance indicator measurement is superior than an average performance indicator measurement that is represented by the particular threshold.

4. The method of claim 1, where the first user and the second user are parts of a team of a call center.

5. The method of claim 1, where the first user is not required to determine a team of the first user before submitting the feedback.

6. The method of claim 1, further comprising:
accepting other feedback submitted by the second user.

7. A system comprising:
a memory; and
a processor to:
provide, for display, a first performance indicator measurement of a first user using a web-based contact system;
determine that the first performance indicator measurement of the first user satisfies a threshold;
prompt, based on determining that the first performance indicator measurement of the first user satisfies the threshold, the first user to submit feedback on a performance of the first user, while using the web-based contact system, associated with the first performance indicator measurement of the first user;
receive the feedback submitted by the first user based on prompting the first user to submit the feedback;
store information regarding the feedback;
determine a second performance indicator measurement of a second user using the web-based contact system;
determine that the second user has gone offline after being online;

identify, when the second user is offline, a selection of a tab of the web-based contact system; and offer training content related to using the web-based contact system based on the information regarding the feedback of the first user, based on determining that the second user has gone offline after being online, based on the selection of the tab, and based on the second performance indicator measurement of the second user.

8. The system of claim 7, where the web-based contact system is used in a contact center.

9. The system of claim 7, where the feedback is information regarding how the first user achieved the first performance indicator measurement.

10. The system of claim 7, where the first user and the second user are parts of a team of a call center.

11. The system of claim 7, where the first user is not required to determine a team of a call center before submitting the feedback.

12. The system of claim 7, where the processor is further to:

receive other feedback submitted by the second user; and store the other feedback in a taxonomic tree or hierarchy.

13. A non-transitory computer-readable medium storing instructions, the instructions comprising:

one or more instructions that, when executed by at least one processor, cause the at least one processor to:

determine a first performance indicator measurement of a first user using a web-based contact system;

determine that the first performance indicator measurement of the first user satisfies a threshold;

prompt, based on determining that the first performance indicator measurement of the first user satisfies the threshold, the first user to submit feedback on a performance of the first user, while using the web-based contact system, associated with the first performance indicator measurement of the first user;

receive the feedback submitted by the first user based on prompting the first user to submit the feedback;

store information regarding the feedback;

determine a second performance indicator measurement of a second user;

determine that the second user has gone offline after being online;

identify, when the second user is offline, a selection of a tab of the web-based contact system; and offer training content related to using the web-based contact system based on the information regarding the feedback of the first user that is stored, based on determining that the second user has gone offline after being online, based on the selection of the tab, and based on the second performance indicator measurement of the second user.

14. The non-transitory computer-readable medium of claim 13, where the instructions further comprise:

one or more instructions that, when executed by the at least one processor, cause the at least one processor to:

provide, for display, information identifying the first performance indicator measurement.

15. The non-transitory computer-readable medium of claim 13, where the feedback is information regarding how the first user achieves the first performance indicator measurement.

16. The non-transitory computer-readable medium of claim 13, where the first user is not required to determine a team of the first user before submitting the feedback.

17. The non-transitory computer-readable medium of claim 13, where the instructions further comprise:

one or more instructions that, when executed by the at least one processor, cause the at least one processor to:

accept other feedback submitted by the second user; and store the other feedback in a taxonomic tree or hierarchy.

18. The non-transitory computer-readable medium of claim 13, where the instructions further comprise:

one or more instructions that, when executed by the at least one processor, cause the at least one processor to:

determine that the second user did not perform a particular task while interacting with a customer online; and identify, when the second user has gone offline, the training content based on determining that the second user did not perform the particular task.

* * * * *